(12) United States Patent
Medhin

(10) Patent No.: US 7,634,082 B2
(45) Date of Patent: Dec. 15, 2009

(54) RETRACTABLE TELEPHONE HOLDING UNIT

(76) Inventor: Michael S. Medhin, 420 S. Whiting St., Apt. T-1, Alexandria, VA (US) 22304

( * ) Notice: Subject to any disclaimer, the term of this patent is extended or adjusted under 35 U.S.C. 154(b) by 612 days.

(21) Appl. No.: 11/599,355

(22) Filed: Nov. 15, 2006

(65) Prior Publication Data

US 2007/0060209 A1 Mar. 15, 2007

Related U.S. Application Data

(62) Division of application No. 10/948,436, filed on Sep. 24, 2004, now Pat. No. 7,155,265.

(60) Provisional application No. 60/505,157, filed on Sep. 24, 2003.

(51) Int. Cl.
*H04M 1/00* (2006.01)
*H04M 9/00* (2006.01)

(52) U.S. Cl. .................. 379/455; 379/430; 379/446; 455/575.2; 455/575.6

(58) Field of Classification Search .......... 379/426, 379/430, 445, 446, 454, 455; 455/575.2, 455/575.6, 569.1, 90.3; 224/181, 930
See application file for complete search history.

(56) References Cited

U.S. PATENT DOCUMENTS

| | | | |
|---|---|---|---|
| 2,503,846 A | 4/1950 | Shann | |
| 4,741,030 A | 4/1988 | Wilson | |
| 4,782,527 A | 11/1988 | Williamson et al. | |
| 4,821,318 A | 4/1989 | Wu | |
| 4,907,266 A | 3/1990 | Chen | |
| 5,003,589 A | 3/1991 | Chen | |
| 5,177,784 A | 1/1993 | Hu et al. | |
| 5,506,911 A | 4/1996 | Neuman et al. | |
| 5,721,775 A | 2/1998 | Leifer | |
| 5,793,865 A | 8/1998 | Leifer | |
| 5,841,858 A | 11/1998 | Frierson | |
| 5,841,859 A | 11/1998 | Chen | |
| 6,055,312 A | 4/2000 | Pralus et al. | |
| 6,130,953 A | 10/2000 | Wilton et al. | |
| 6,249,684 B1 | 6/2001 | Hasegawa | |
| 6,366,672 B1 | 4/2002 | Tsay | |
| 6,496,589 B1 | 12/2002 | Pham et al. | |
| 6,570,987 B1 | 5/2003 | Saarikko | |
| 6,633,231 B1 | 10/2003 | Okamoto et al. | |

(Continued)

FOREIGN PATENT DOCUMENTS

GB 2255471 A 4/1992

*Primary Examiner*—Tuan D Nguyen
(74) *Attorney, Agent, or Firm*—McGuireWoods LLP

(57) ABSTRACT

An apparatus for enabling hands free operation of cell phones and other portable electronic devices is disclosed. The apparatus may include a headset having a housing and a set of extendable links coupled at a base end to the housing and coupled at an opposite end to an end cap. The set of extendable links may fit within an interior of the housing when fully retracted, and the end cap may be latched to the housing. The set of extendable links may be extended by hand, extended by spring force and retracted by hand, or extended and retracted by motorized force. An adjustable swivel arm is coupled at one end to the housing, and at the other end to a gripping device. The gripping device includes a plurality of gripping arms. A portable electronic device may be inserted and secured within the plurality of gripping arms.

13 Claims, 22 Drawing Sheets

U.S. PATENT DOCUMENTS 6,934,517 B2 8/2005 Fujihashi
2002/0090922 A1 7/2002 Smadja et al.
2005/0284901 A1 12/2005 Taylor
2006/0079306 A1 4/2006 Zheng

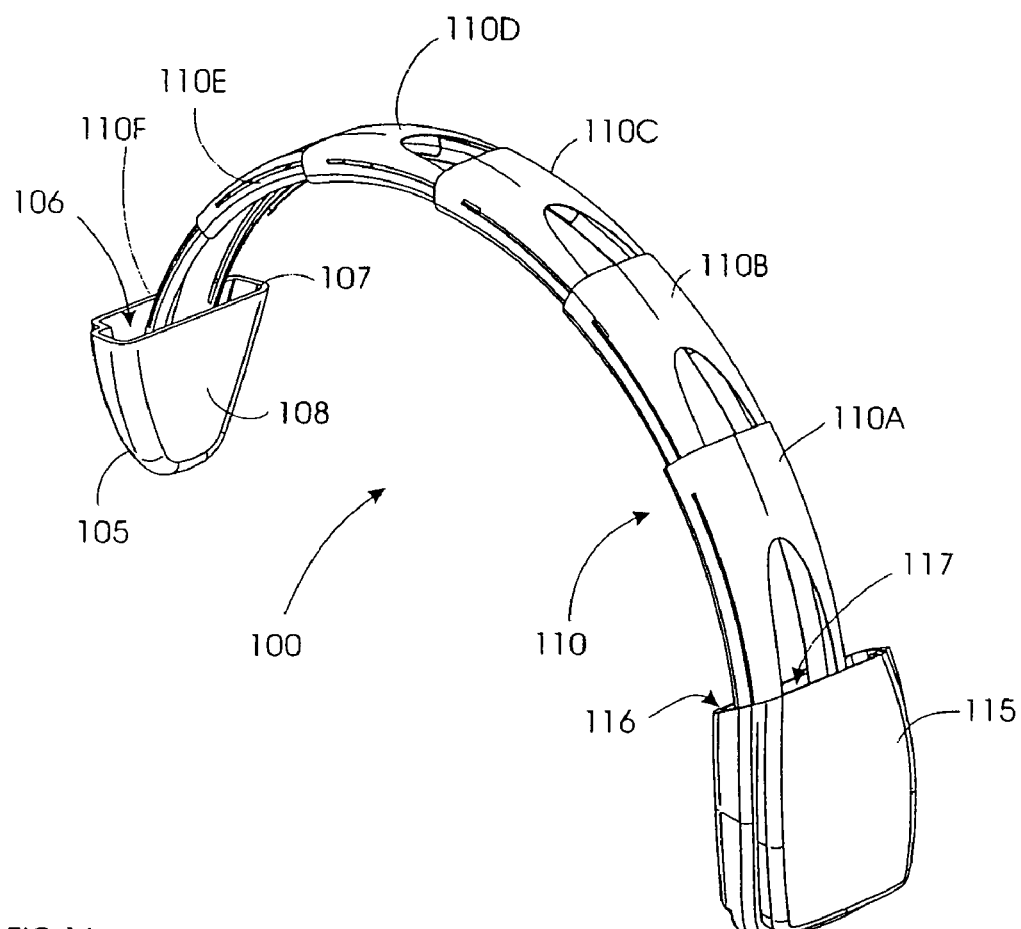
FIG.1A
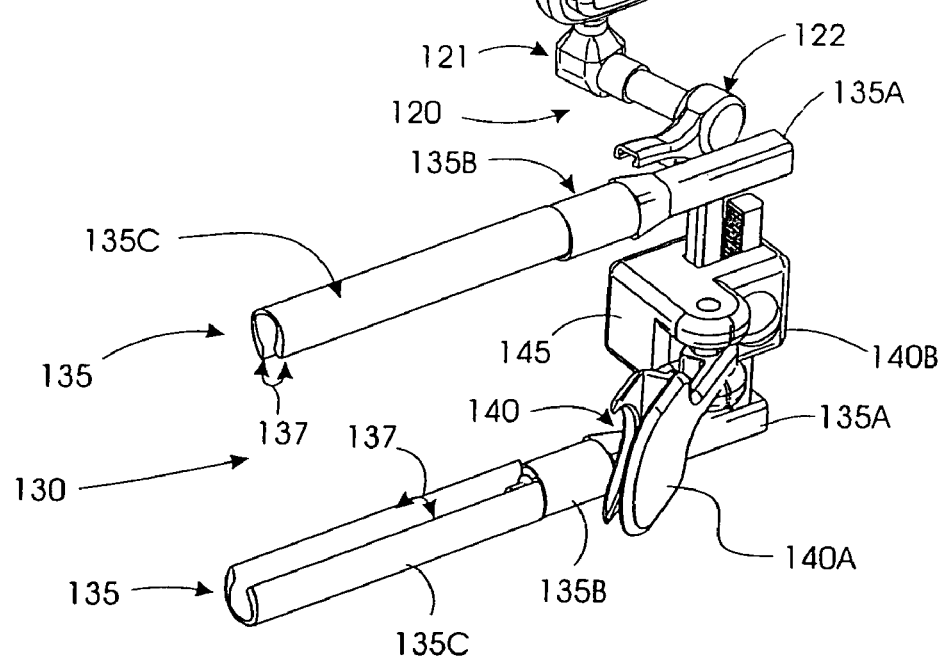

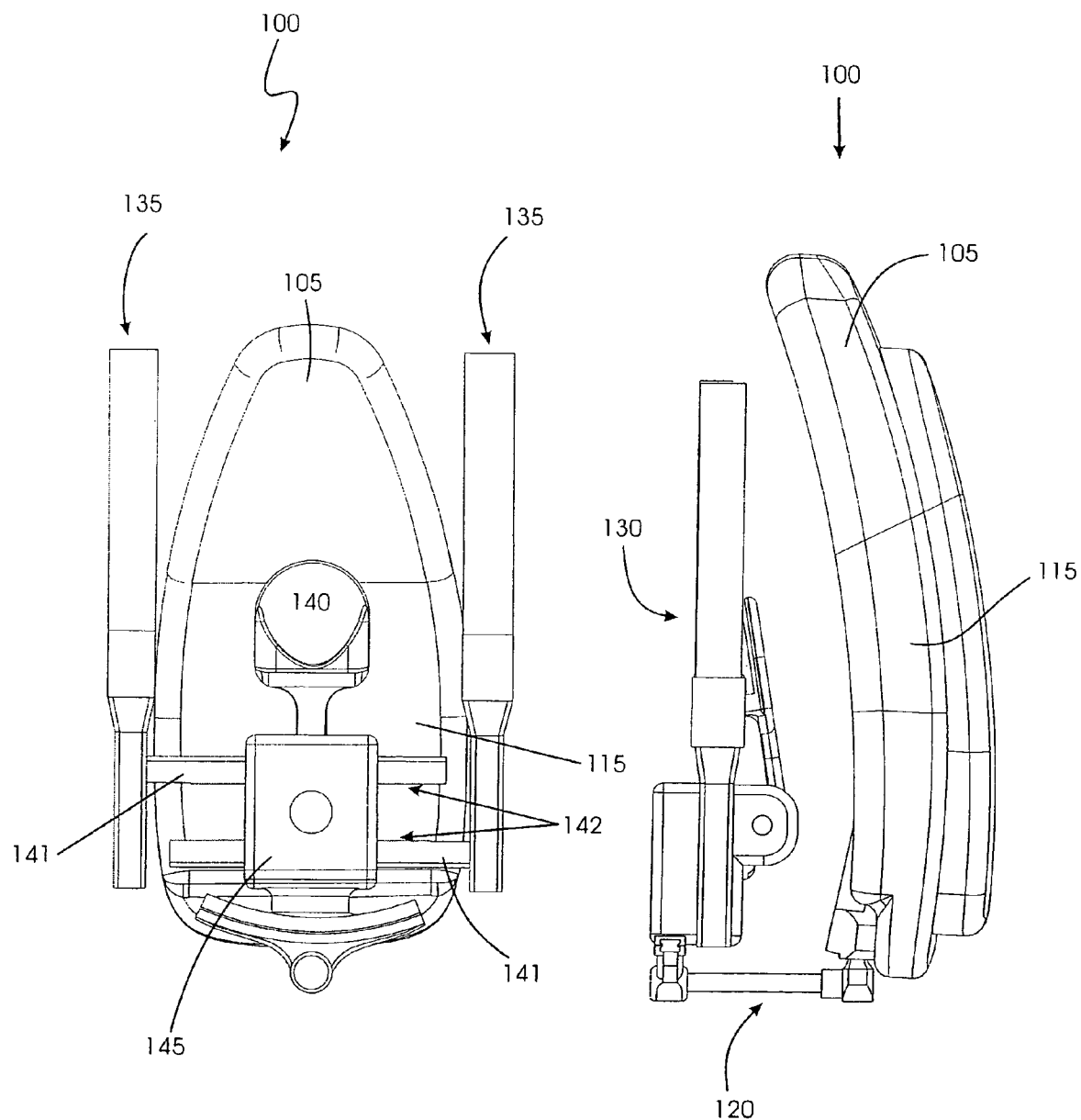

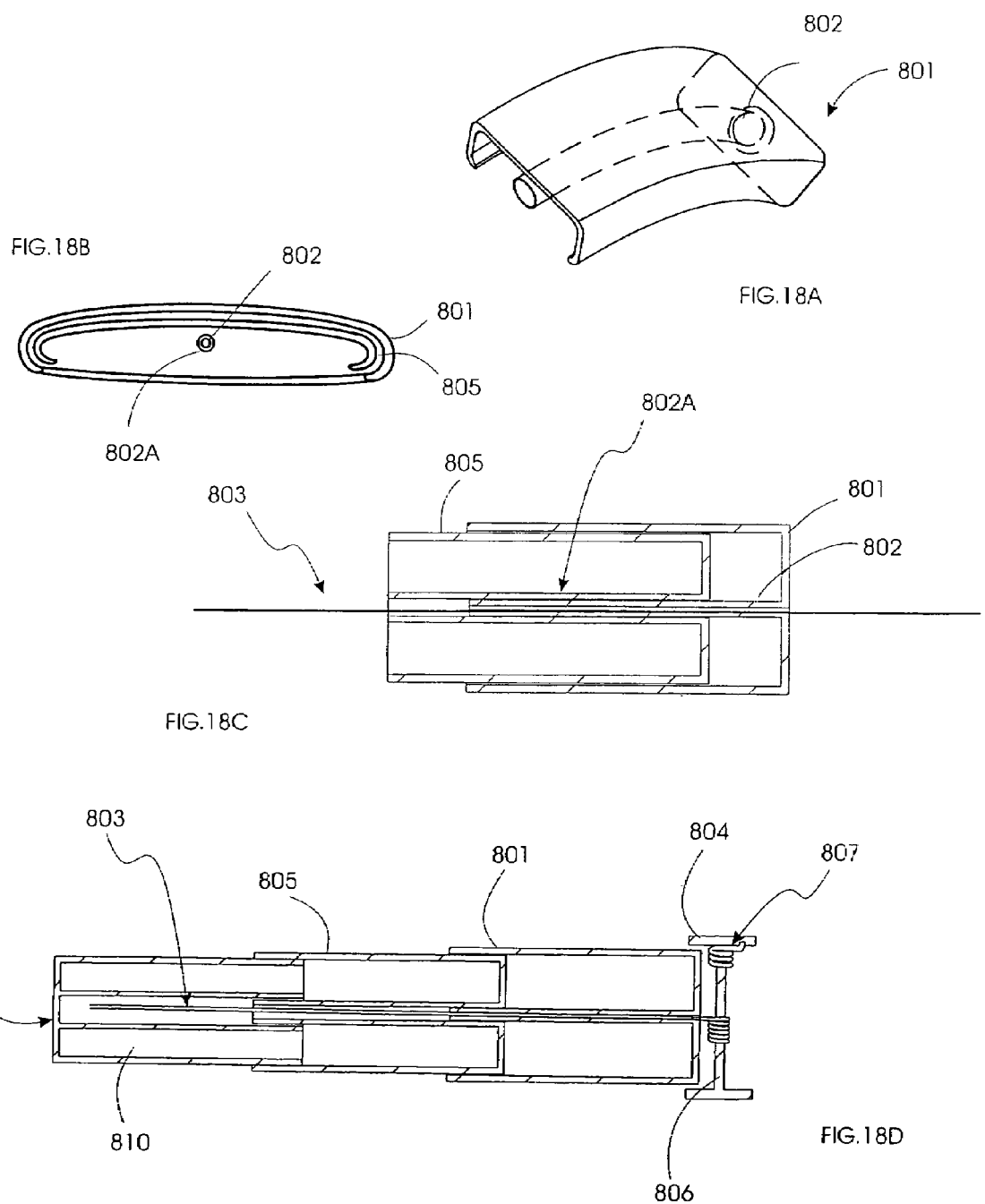

RETRACTABLE TELEPHONE HOLDING UNIT

CROSS REFERENCE TO RELATED APPLICATIONS

This is a divisional of U.S. patent application Ser. No. 10/948,436, filed Sep. 24, 2004 now U.S. Pat. No. 7,155,265, which claims benefit of provisional application No. 60/505,157, filed Sep. 24, 2003, the disclosures of which are incorporated herein by reference, in their entirety.

FIELD OF THE INVENTION

The invention relates to a retractable holder, and more particularly to an extendable holder having a gripping device that enables hands-free use of a portable electronic device.

DESCRIPTION OF RELATED ART

Corded and cordless headsets having at least one earphone, a microphone, and headband are common. Examples of areas in which headsets are used include telephony, radio communications by soldiers and law enforcement personnel, and collaborative video games. Such headsets often include one earphone so that the wearer can hear other noises with the other ear. Whether connected to a source electrical device via a cable or radio-frequency (e.g., infrared) channel, such headsets often restrict a wearer's freedom of movement. To ensure that the headset stays in place while the wearer moves, most headsets include a headband spanning the upper part of the head.

Headsets without headbands have also been developed. Such headsets often clip solely to one ear of a wearer. A rotatable arm, provided with a microphone at its distal end, is coupled directly to the earphone. Even though such headsets may be lightweight, they can easily fall off and often prove uncomfortable if worn for long periods of time. Additionally, such headsets are often connected to a source electrical device via a cable.

A headset for holding a cordless telephone has also been developed. The cordless telephone has an adjustable headband formed by joining a first and second curved portion. A battery compartment is provided on the first curved portion. On the inside surface of the second curved portion is an earpiece for placement on the wearer's ear. Additionally, an extended microphone is rotatably connected to the second curved portion at the base of the earpiece. The second curved portion has a keypad that may be withdrawn from the keypad receptacle and used to dial the phone without having to remove the headset. A retraction mechanism maintains a wire, which is permanently attached to the keypad, under tension when the keypad is withdrawn from the second curved portion. The retraction mechanism subsequently locks the wire in place when the withdrawal action stops.

The headset may be disassembled so that the second curved portion may be used as a handset. However, the headset itself is bulky and heavy, and takes up a large amount of space, even when disassembled. Additionally, the keypad wire is likely to get tangled, snagged, bent, or broken with prolonged use.

SUMMARY OF THE INVENTION

In one embodiment, the invention provides a compact, extendable headset for use with various portable electronics devices, such as, but not limited to cellular telephones, MP3 players, mini-disk players, personal digital assistants, and the like.

In one embodiment, the headset includes a housing having an interior, a headband, an end cap, a swivel arm, and a gripping device. The headband is formed of a set of links coupled to the housing and configured to be housed in the interior of the housing in a retractable position and extending from the housing in an extended position. The end cap is coupled to a distal portion of the set of links, and is configured to enclose the set of links within the housing when in the retracted position. One end of the swivel arm is adjustably coupled to the housing. The other end is adjustably coupled to the adjustable gripping device.

The set of adjustable links includes a base link coupled to the interior of the housing, and a plurality of nestable intermediate links slidably fitted within the base link. The base link and each of the nestable intermediate links may be convex, and at least one of the plurality of nestable intermediate links is coupled to the end cap. The end cap may further include a pad on an inner exterior surface thereof. Additionally, the end cap may be formed of a sound-proofing material. Also, at least one of the end cap or the set of links may be weighted to counterbalance a weight of the gripping device.

The swivel arm may include an adjustable rod having a portion thereof coupled to the housing and an end thereof coupled to a rotatable elbow joint, as well as an extension rod coupled at one end to the rotatable elbow joint, and at the other end to a connector. The connector may include an arcuate rail guide and an interlocking arcuate rod.

The gripping device may include a gearbox removably coupled to the swivel arm. Additionally, an adjustable clamp (e.g., C-clamp) may be coupled to the gearbox, and the adjustable clamp may include an upper arm and a lower arm separated by a gap. Also, a pair of adjustable gripping arms may be coupled to the gearbox and may extend one on either side of the adjustable clamp. A base portion of the adjustable clamp may be coupled to a dampening gear, and the adjustable clamp may be movable between a first upright position and a second position. Additionally, the adjustable clamp may lock in the second position.

Each gripping arm of the pair of gripping arms may further include a base end coupled to a cross bar; a spring housing connected to the base end; a spring located within the spring housing; and a rotatable slotted gripping material having a base end coupled to the spring housing. Each cross bar may be toothed along a surface thereof to couple to a gear in the gearbox.

BRIEF DESCRIPTION OF THE DRAWINGS

FIG. 1A is a perspective view of a headset and gripping device, according to one embodiment of the invention;

FIG. 2A is a bottom view of an embodiment of an extendable holder for electronics devices shown in a closed position;

FIG. 2B is a side view of an embodiment of an extendable holder for electronics devices shown in a closed position;

FIG. 18A is a perspective view of another extendable link according to another embodiment of the invention;

FIG. 18B is an end view of a set of extendable links according to an embodiment of the invention;

FIG. 18C is a top, cross-sectional view of the set of extendable links of FIG. 18B;

FIG. 18D is another top, cross-sectional view of the set of extendable links of FIG. 18B.

DETAILED DESCRIPTION OF EMBODIMENTS OF THE INVENTION

Figure 1B:
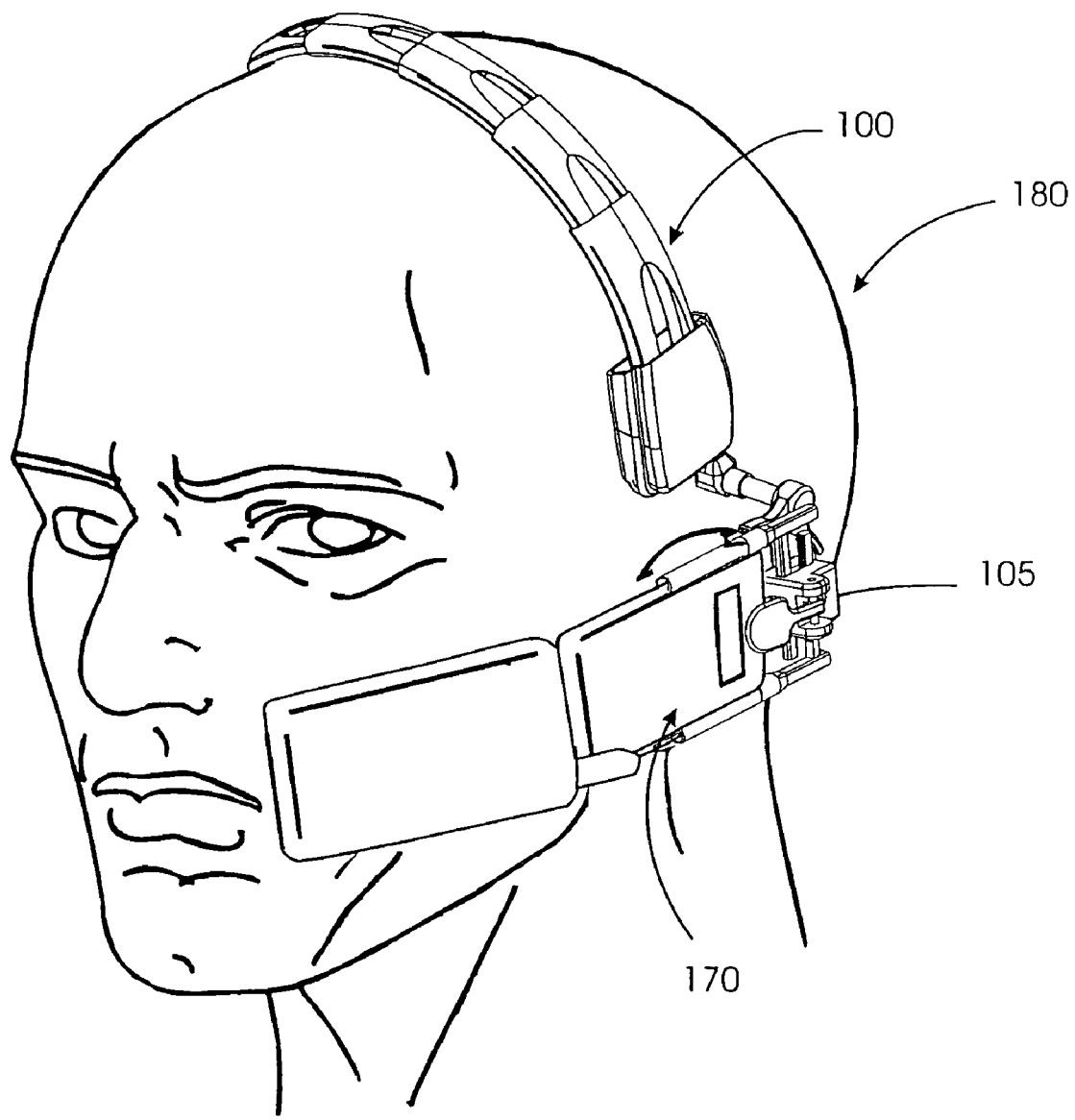
FIG. 1B is a perspective view showing an exemplary use of the headset.

In one embodiment, the invention provides a compact, extendable headset for use with various portable electronics devices, such as, but not limited to cellular telephones, MP3 players, mini-disk players, personal digital assistants, and the like. Briefly, the apparatus includes an end cap attached to a free end of a headband formed of an interlocking set of extendable links. The other end of the headband attaches to the interior of a housing. In embodiments, where the headband is motorized, the headset may be configured to include a power source and motor. The set of extendable links fits entirely within the interior of the housing when retracted, and the end cap fits against the housing to provide a aesthetically pleasing shape and to protect the headband from damage. The end cap may be locked to the housing using a magnetic, electromagnetic, mechanical, or electromechanical latch.

A cell phone or other portable electronic device may be easily inserted or removed from a gripping device while the headset is worn. Because the gripping device holds a self-powered cell phone or other portable electronic device, the headset is not tethered by a cable. When the headset is worn, it may hold a cell phone such that the phone's speaker is adjacent the wearer's ear canal and its microphone is proximate the wearer's mouth.

A bottom portion of the housing connects to one end of an elbow-jointed swivel arm. The other end of the swivel arm connects to a gripping device, which is adapted to hold a telephone, or other portable electronic device, adjacent a wearer's head for hands-free operation. The connecting swivel arm may be rotated so that the gripping device moves between a first closed position and a second operating position.

The gripping device includes a spring-loaded adjustable clamp centrally disposed between two parallel adjustable gripper arms. An interior surface of each gripper arm is formed of a gripping material having a cut-out portion that extends longitudinally along a length thereof. The adjustable clamp and the gripper arms securely hold a cell phone or other portable electronic device.

FIG. 1 is a perspective view of a headset 100 and gripping device 130, according to one embodiment of the invention. As shown, the headset 100 includes an end cap 105 connected to a distal end of a set of extendable links (e.g., headband) 110. The base end of the set of links 110 is connected to a housing 115. One part of a swivel arm 120 adjustably couples to a portion of the housing 115. The other part of the swivel arm adjustably couples to a base portion of the gripping device 130. FIG. 1A illustrates the headset in an open position with the set of extendable links 110 fully extended.

A portion of a distal link 110F of the set of links 110 may be coupled to a portion of the end cap 105. In the embodiment shown, the distal link 110F is coupled to the interior portion 106 of the end cap 105 so that the links 110A, 110B, 110C, 110D, 110E, and 110F may be fully concealed when the rim 107 of the end cap 105 abuts a rim 116 of the housing 115, as discussed below. It should be understood by those of skill in the art that the embodiment shown in FIG. 1 is not limited to the links 110A-110F. For example, more of less links are contemplated by the invention, with the limitation that the links are moveable with respect to one another, and are capable of fitting on a user's head.

In embodiments, each of the distal links 110A-110E of the set of links nests within and slidably connects to an adjacent. That is, the set of links are capable of telescoping within one another or in relation to one another. A portion of the base link 110A couples to a portion of the housing 115, and in one embodiment, couples to an interior portion of the housing 115. In this manner, the set of links 110 are designed to retract, and be fully concealed, within the interior 117 of the housing 115 when the rim 107 of the end cap 105 abuts the rim 116 of the housing 115.

The set of links 110 extends to the open position shown in FIG. 1A, with or without the help of springs or motorized force, and may be held in the open position by friction, torsion, or tension. For example, each of the links 110A, 110B, 110C, 110D, 110E, and 110F may be formed to have a base portion that is wider than a distal portion. Movement of the end cap 105 away from the housing 115 pulls the nested links in sequential fashion from the interior 117 of the housing 115. Thus, link 110F slides within the interior of link 110E until a width of the base portion of link 110F (or a peg) engages a narrower distal end of the link 110E. This causes the link 110E to slidably move within the interior of the link 110D until a width of the base portion of link 110E engages a narrower distal end of the link 110D. This process is repeated link by link until the set of links 110 is fully extended.

To retract the headset 110, the end cap 105 is moved toward the housing 115. So, for example, when the force applied to the end cap 105 is greater than a frictional force that holds the base end of link 110F within the narrower distal end of the link 110E, the link 110F will slidably move within the interior of the link 110E until a portion of the end cap (or a peg associated with the link 110F) contacts a portion of the link 110E. This process sequentially repeats for each link until the set of links 110 is either adjusted to a desired degree or fully retracted within the interior of the housing 115.

The end cap 105, the housing 115, the links 110, and the swing arm 120 may be formed of plastic, metal, or other suitable material, in a variety of colors. These components 105, 110, 115, and 120 may be formed of a single piece of material or of two or more pieces fitted together. Also, the end cap 105 may be appropriately weighted to partially or fully counterbalance the weight of the gripping device 130 and/or the weight of a portable electronic device secured by the gripping device 130. Additionally, one or more of the links 110A, 110B, 110C, 110D, 110E, 110F may include one or more cut-out portions, and may be appropriately weighted to fully or partially counterbalance the weight of the gripping device 130 and/or the weight of a portable electronic device (not shown) secured by the gripping device.

The housing 115 may be adapted to include a latch that secures the end cap 105 in the closed, retracted position (FIG. 1I). If the set of links 110 is spring-loaded, manipulating the latch (via tactile or voice command) may release the end cap, thereby freeing the set of links 110 to automatically extend. In another embodiment, the housing 115 (and/or the set of links 110) may be adapted to include a battery-operated motor that extends and retracts the set of links 110 in response to a command signal.

In one embodiment, the swing arm includes one or more rotatable joints (knuckles) 121 that provide three or more degrees of freedom. One portion of the swing arm 120 adjustably couples to the housing 105 to permit adjustment of the vertical position of the gripping device 130 in relation to the housing 115; whereas another portion of the swing arm 120 includes a connector 122 used to adjustably couple the gripping device 130 to the headset 100.

The gripping device 130 includes a gearbox 145 that adjustably couples to the connector 122. A spring-dampened, rotatable adjustable clamp 140 is rotatably coupled to a portion of the gearbox 145, and includes an upper arm 140A and a lower arm 140B. The lower arm 140B is preferably smaller and substantially parallel to the upper arm 140A. The adjustable clamp 140 is flanked on either side by a gripper arm 135, which includes a base end 135A that couples to a cross bar 141. In embodiments, each cross bar 141 may couple to a gear (not shown) in a gearbox 145. In this manner, each gripper arm 135 is configured to move the same distance, inwards or outwards. Each gripper arm 135 further includes a spring housing 135B connected on one side to the base end 135A, and to a hollow gripping portion 135C. Each hollow gripping portion 135C may include a channel (or slot) 137 formed along a length thereof.

Figure 1C:
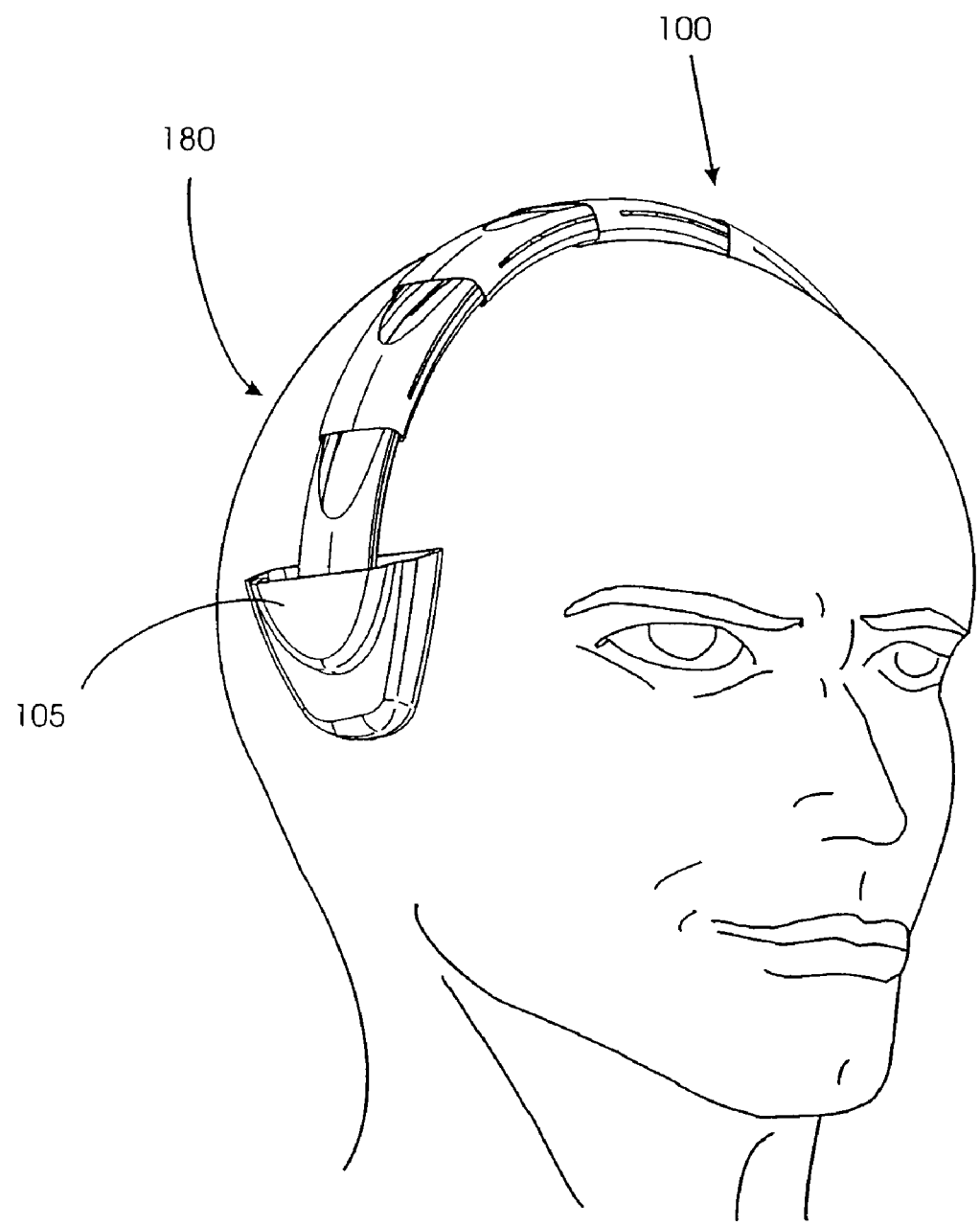
FIG. 1C is another perspective view showing an exemplary use of the headset.
Figure 1D:
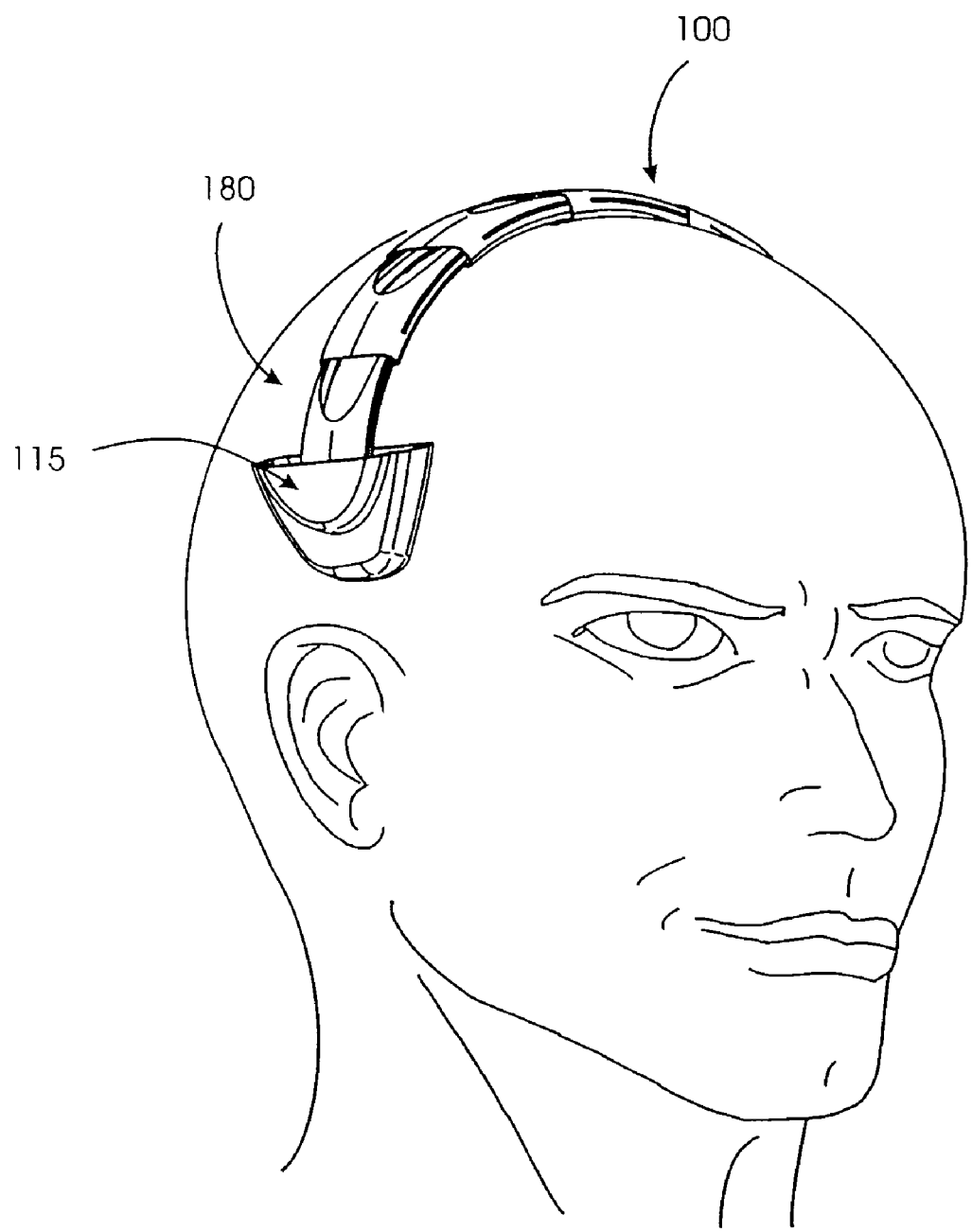
FIG. 1D is another perspective view showing an exemplary use of the headset.

FIGS. 1B-1D are perspective views showing an exemplary use of the headset 100. In these figures, the headset 100 (in the extended position shown in FIG. 1A) is positioned on the head of a wearer 180. A personal electronic device 170 is gripped by the gripping device 105. In the embodiment illustratively shown in FIG. 1A, the personal electronic device 170 is a cellular phone; however, the gripping device 105 may be used to position other types of portable electronic devices next to the head of a wearer 180. As shown, use of the headset and gripping device 105 positions the speaker of the phone proximate the wearer's ear canal while simultaneously positioning the phone's microphone proximate the wearer's mouth area. This arrangement enables virtually hands-free operation of a cellular or digital phone.

In FIG. 1C the set of links 110 may be extended to fully or partially cover the wearer's opposite ear (e.g., the ear that is not proximate the gripping device 105). Positioning the end cap 105 in this manner may help reduce background noises and make it easier for the wearer 180 to hear and understand sounds emanating from the portable electronic device 170. In one embodiment, a surface of the end cap 105 is contoured to fit around the wearer's ear or contoured to block background noise from entering the wearer's ear canal. Additionally, the end cap may be made of a sound-blocking material. In FIG. 1D, the end cap is shown positioned on the head of a wearer 180 in a location that leaves the wearer's ear completely exposed. Wearing the headset 100 in this manner may prove useful in quiet and/or humid environments.

FIG. 2A is a bottom view of the headset 100 in a closed position when the headband is fully retracted and enclosed within the housing 115. In this retracted position, the end cap 105 adjoins the housing 115 so that the set of links is completely encapsulated and protected from damage. Additionally, the gripping device 130 of FIG. 1 is rotated upwards about 90 degrees and inwards about 180 degrees so that the gripper arms 135 substantially parallel the length of the combined housing 115 and end cap 105. Additionally, the gripper arms 135 are moved inwards towards each other as much as the cross bars 141 will allow. As shown, a surface of each crossbar 141 may include teeth 142 that engage a gear housed within the gearbox 145.

FIG. 2B is a side view of the headset 100 of FIG. 2A that shows the end cap 105 adjoining the housing 115, and the swivel arm adjusted so that the gripping device 130 substantially parallels the length of the housing 115 and the end cap 105. As shown, the housing 115 and the end cap 105 may curve radially inward so that the headset 100 more comfortably fits a wearer.

Figure 3:
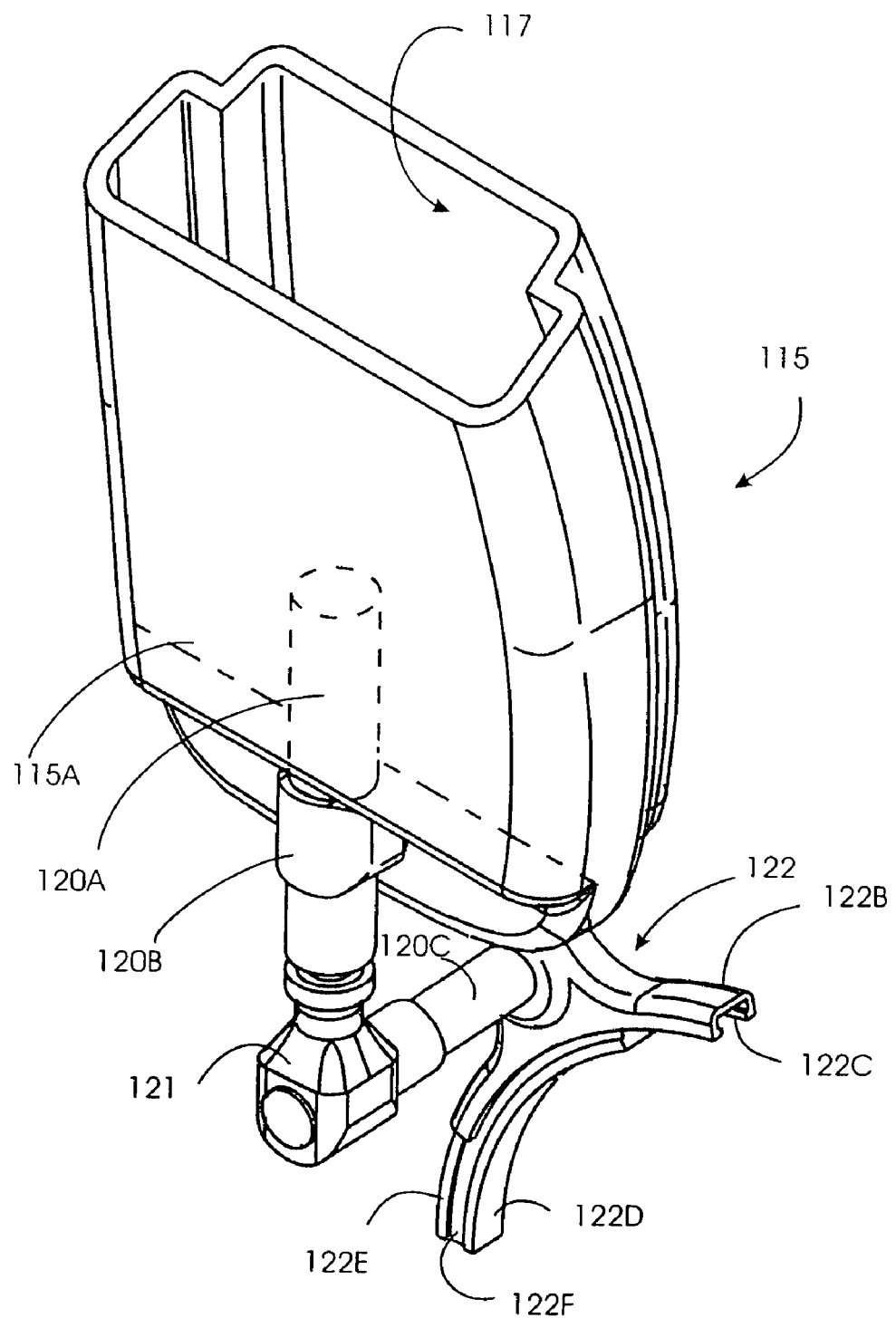
FIG. 3 is a perspective view of a housing and attached swivel arm, according to one embodiment of the invention.

FIG. 3 is a perspective view of the housing 115 and attached swivel arm 120, according to one embodiment of the invention. The housing 115 is shown with the end cap 105 and the base link 110A removed. Accordingly, the interior 117 of the housing 115 is empty in this Figure. The housing 115, however, is designed to accommodate the retracted links 110.

The housing 115 includes a back plate 115A, which is configured and formed to fit against a wearer's head. FIG. 3, further shows several subassemblies of the swivel arm 120. For example, an extension rod 120A slidably fits within a corresponding channel formed in a portion of the back plate 115A. The extension rod 120A slides through an adjuster 120B, which may include an actuator that applies a frictional force to the extension rod 120B to hold the extension rod in a desired position. Additionally, the adjuster 120B may be manipulated by a wearer so that the extension rod 120A slides freely within the housing 115. In this manner, the entire swivel arm 120 may be vertically adjusted upwards and downwards relative to the housing 115.

One end of the extension rod 120A terminates in a rotatable elbow 121. In turn, the rotatable elbow 121 connects to one end of extension rod 120C, such that the extension rod 120C is positioned at a right angle with respect to the extension rod 120A. The rotatable elbow 121 is capable of rotating through at least 180 degrees. The distal end of the extension rod 120C may connect to a second rotatable elbow (not shown). This second rotatable elbow may be capable of rotating through at least 180 degrees, and may be positioned such that its plane of rotation is orthogonal to the plane of rotation of rotatable elbow 121. The connector 122 further includes a curved rocker arm 122B having twin opposing guide ledges 122C extend inwardly towards each other, with a gap therebetween. When viewed from an end, the curved rocker arm 122C has a C-like cross-sectional shape. An arcuate rod 122D has flanges 122E that slidably fit within the channels formed between the interior surfaces of the ledges 122C and a substantially parallel inner surface of the top portion of the curved rocker arm 122B. Additionally, the rod 122D has a narrow perpendicular body 122E fits within the gap formed between the ledges 122C. A stopper 122F may be provided at both ends of the rod 122D so that the rod 122D does not fall out of the curved rocker arm 122B.

Figure 4:
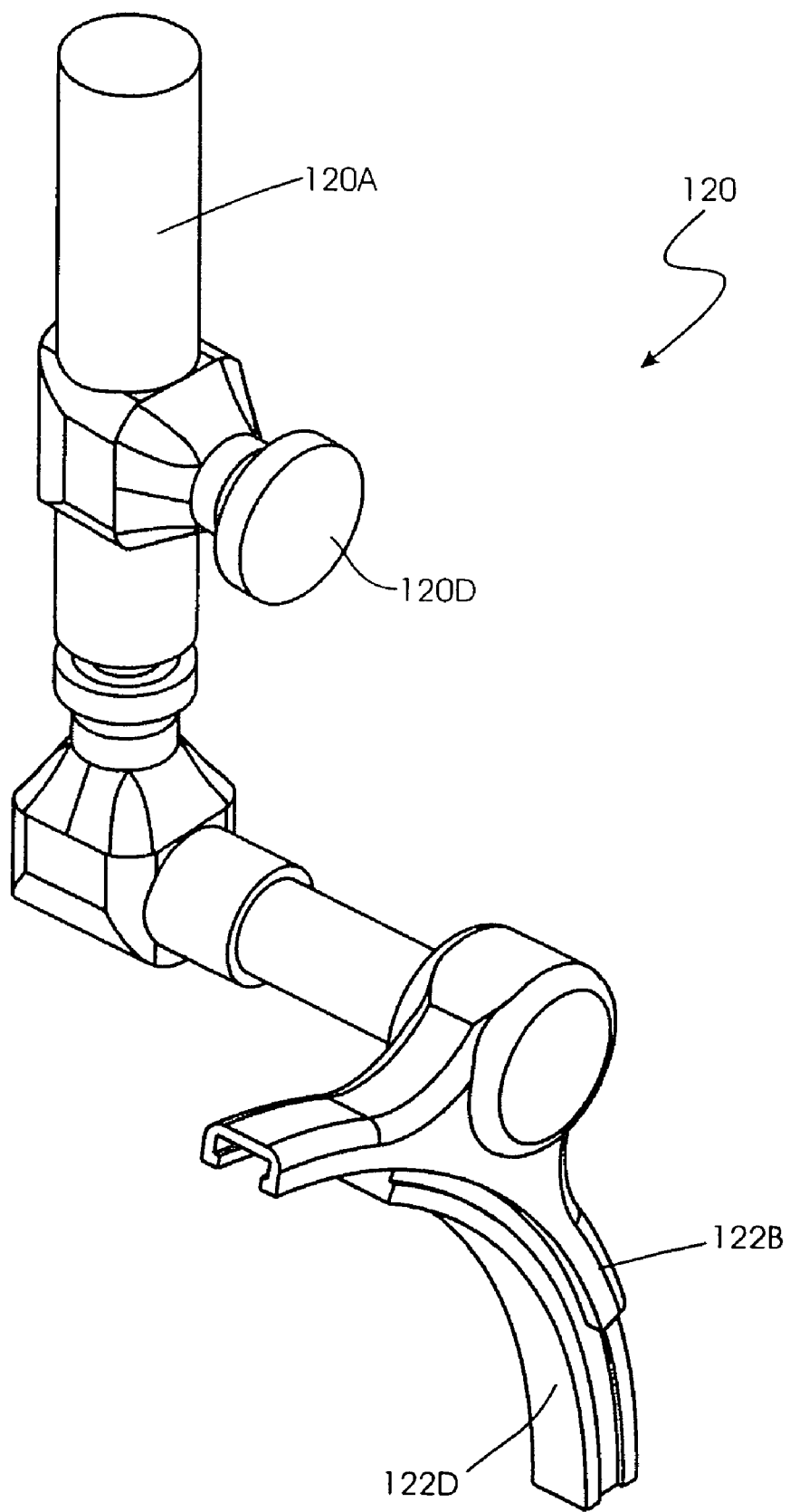
FIG. 4 is a perspective view of a swivel arm according to one embodiment of the invention.

FIG. 4 is a perspective view of the swivel arm 120. The swivel arm, as previously discussed, includes the extension rod 120A, actuator 120D, curved rocker arm 122B, and arcuate rod 122D, which is slidably fitted within the curved rocker arm 122B. The adjuster 120B may be a turn-knob, a push-button detent, or other type of device that holds the extension rod 120A in a fixed position until actuated.

Figure 5:
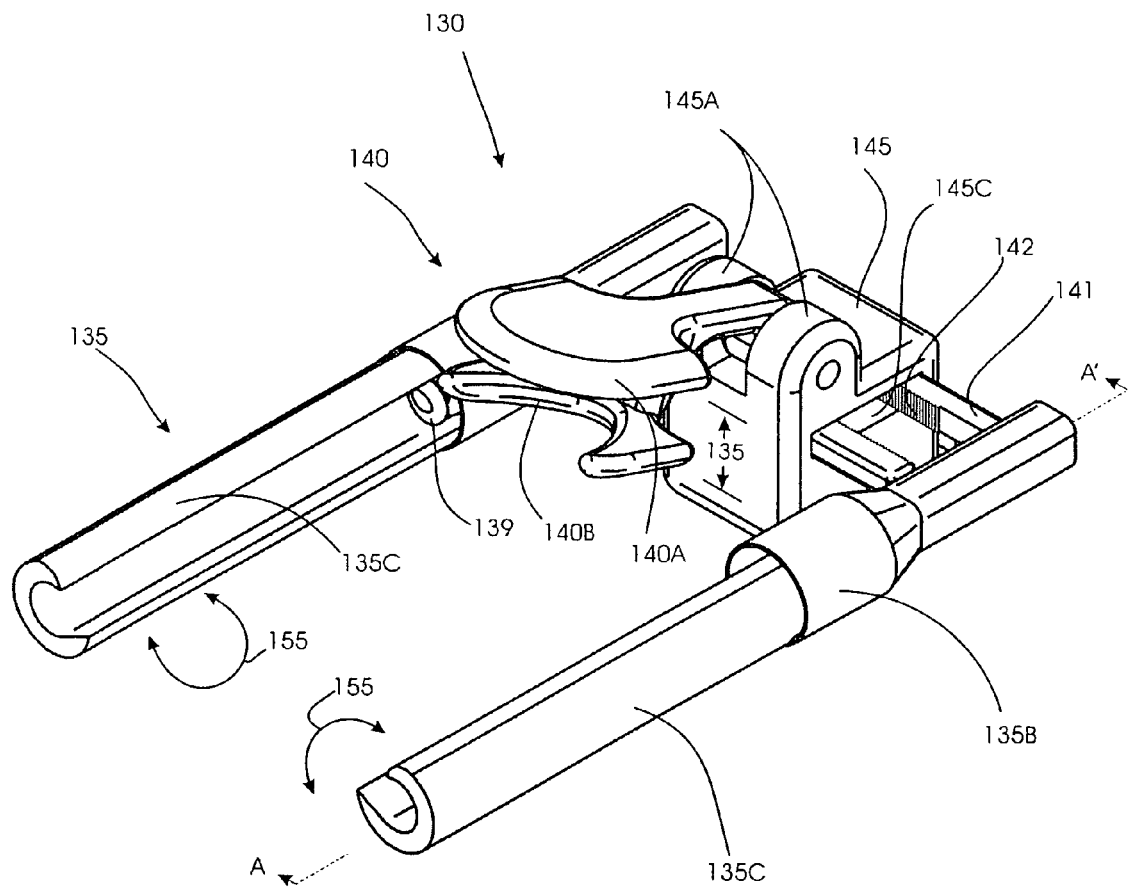
FIG. 5 is a perspective view of a gripping device according to one embodiment of the invention.

FIG. 5 is a perspective view of a gripping device 130. As shown in FIG. 5, the gearbox 145 may have a substantially square shape. A pair of opposing protuberances 145A, separated by a channel, is formed on one side of a top surface of the gearbox 145. This channel receives a base end of the adjustable clamp 140, which is suspended in the channel between the opposing curved protuberances 145A by a spring-loaded pivot 145B that extends horizontally above the top surface of the gear box 145. The spring-loaded pivot 145B permits the C-clamp to be moved from a raised position to a lowered position. In one embodiment, the upper arm 140A makes an angle of approximately 20 to 30 degrees above the horizontal when the C-clamp is in the raised position, and approximately 0 degrees above the horizontal when the C-clamp is in the lowered position. In one implementation, the spring-loaded pivot 145 may act to dampen an upward movement of the adjustable clamp 140. As shown, the upper arm 140A of the adjustable clamp 140 is separated from the lower arm 140B by a gap 138. In one embodiment, the width of the gap 138 may be adjusted to accommodate portable electrical devices of different sizes.

The gearbox 145 may further include corresponding openings 145C formed on opposing sides thereof, through which the toothed cross bars 141 extend. Each toothed cross bar 141 may orthogonally attach to a base end 135A of the each gripper arm 135 to cantilever each gripper arm 135 outside and forward of the gearbox 145 such that the adjustable clamp is flanked on both sides by a gripper arm 135.

Each base end 135A tapers into a larger diameter spring housing 135B, which is open at the opposite end to receive an end of the slotted gripping portion 135C, as well as a spring (not shown), which may be covered by a spring cap 139. Each gripping portion 135C may rotate inwards and downwards, as well as upwards and outwards, in the directions indicated by the arrows 155. The gripping portions 135C are configured such that their upward rotational movement is dampened.

Figure 6:
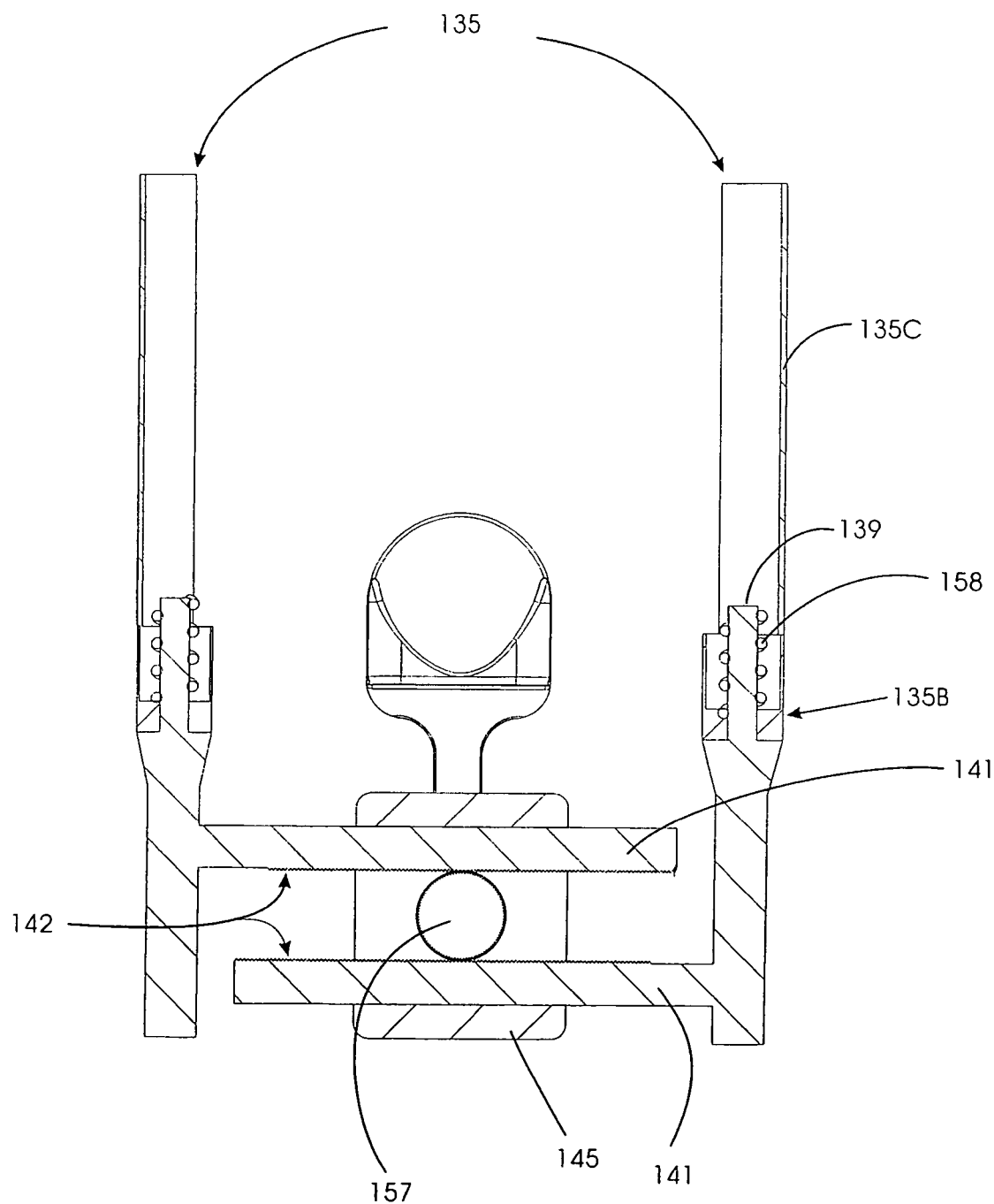
FIG. 6 is a cross-sectional bottom view of the gripping device of FIG. 5, according to one embodiment of the invention.

FIG. 6 is a cross-sectional bottom view of the gripping device of FIG. 5, taken along the line A-A'. As shown in FIG. 6, the gearbox 145 contains a gear 157 that simultaneously engages the teeth 142 of each cross bar 141. Each gripping portion 135 includes a spring housing 135B in which a spring 158 is positioned about a rod that terminates in a spring cap 139. Additionally, each spring housing 135B also encloses an end of each gripping portion 135C.

Figure 7:
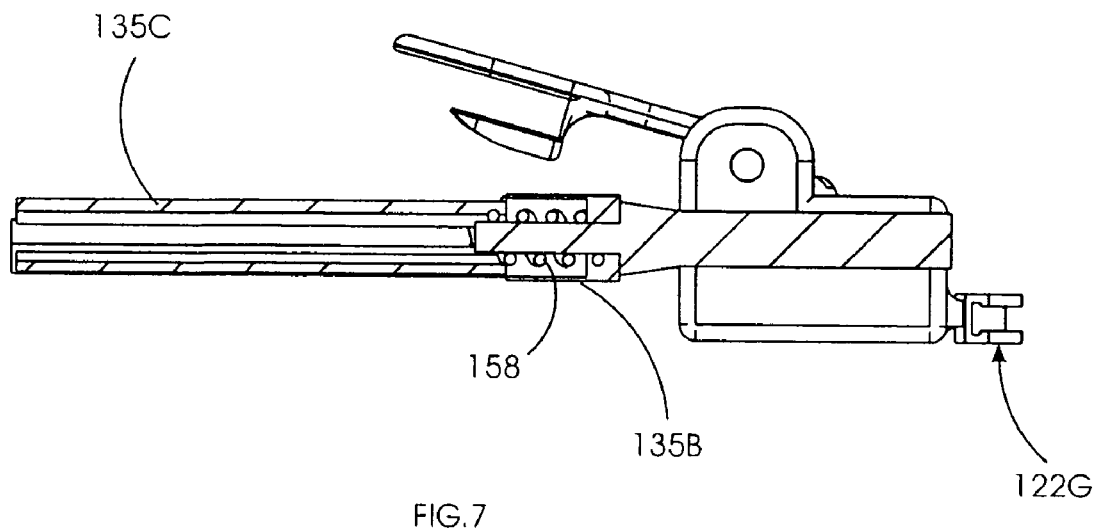
FIG. 7 is a cross-sectional side view of the gripping device of FIG. 5, according to one embodiment of the invention.

FIG. 7 is a cross-sectional side view of the gripping device of FIG. 6 that further illustrates an exemplary placement of the spring 158 and an end of the gripping portion 135C within the spring housing 135B. Also, a curved rail guide 122G may be attached to a side surface of the gearbox 145 such that the gripping device 130 may be connected to the connector 122 (FIG. 1).

Figure 8A:
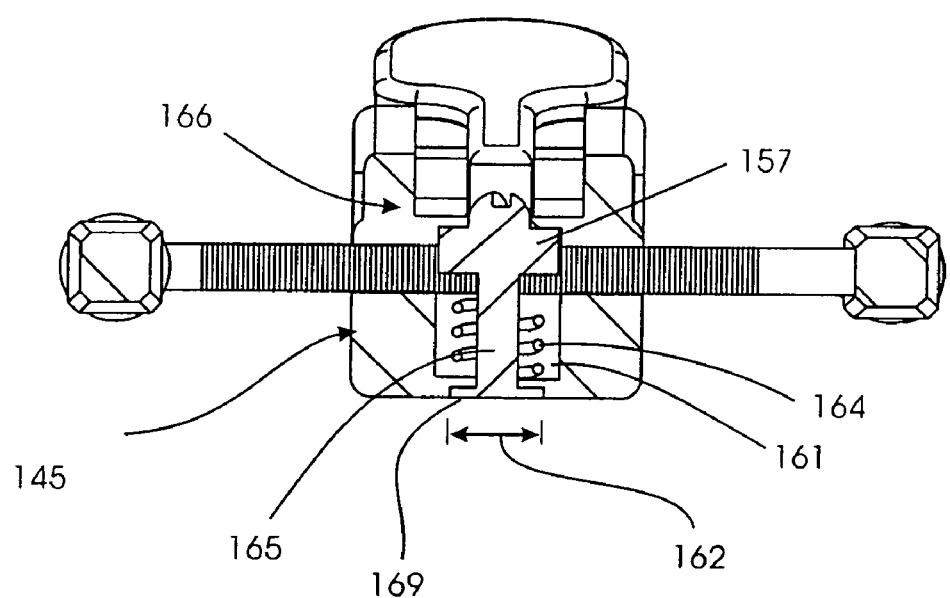
FIG. 8A is a cross-sectional end view of the gripping device of FIG. 5, according to one embodiment of the invention.

FIG. 8A is a cross-sectional end view of the gripping device 130 of FIG. 6. As shown, the interior of the gearbox 145 includes a bore 161, centrally positioned within the body of the gearbox 145. The bore 161 connects at a bottom end to another bore 162, which has a smaller diameter than the bore 161. A spring 164 is disposed within the bore 161, and surrounds a shaft 165 of a setscrew 166. One end of the spring 164 contacts an inner surface of the bore 161; whereas the other end contacts a bottom surface of a flange (e.g., gear) 157 of the setscrew (e.g., adjustable setting mechanism) 166. The adjustable setting mechanism 166 includes a rod 165, which is substantially centrally disposed within an interior of the spring 164. A lower portion of the rod 165 slidably positioned within the bore 162. A bottom end of the rod 165 terminates in a disk or other surface 169 that detachably engages a bottom surface of the gearbox 145, via a projection (e.g., tooth) 169 and recess configuration. The outer circumference of the gear 157 may have teeth that engage the teeth 142 on the cross bars 141.

Figure 8B:
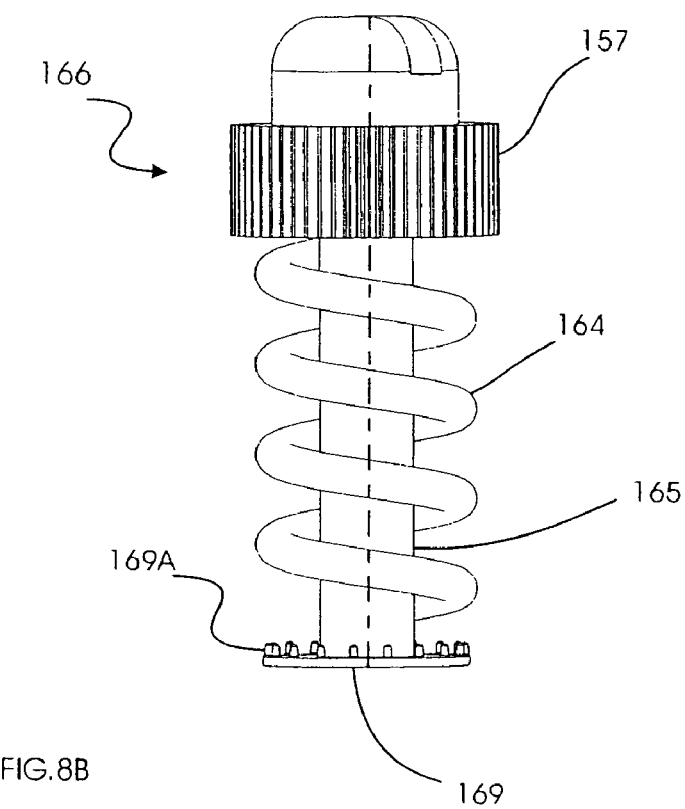
FIG. 8B is a side view of a locking mechanism according to one embodiment of the invention.

Referring to FIG. 8B, a side view of the adjustable setting 166 and spring 164 is shown. The top end of the adjustable setting 166 may include a slot, which may be used to depress and rotate the adjustable setting 166. The gear 157 radially extends about a top portion of the rod 165 and has a larger diameter than the rod 165 and the spring 164. This larger diameter may be used as a spring stop. The spring 164 is coiled about the exterior of the rod 165, and has a top portion that contacts the bottom surface of the gear 157. A disk or surface 169 is attached to a bottom end of the rod 165, and may include a toothed surface 169A.

Figure 8C:
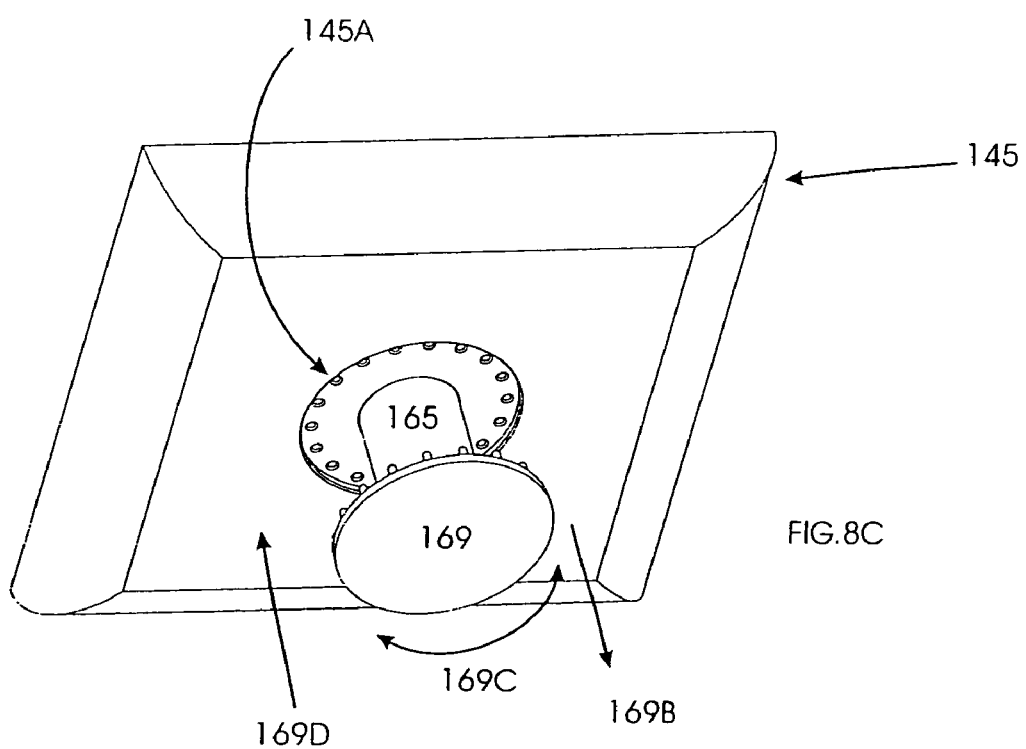
FIG. 8C is a perspective view of a bottom portion of a gearbox shown in FIG. 8A according to one embodiment of the invention.

FIG. 8C is a perspective view of a bottom portion of the gearbox 145. As shown, the bottom of the gearbox 145 may include a recess 145A whose shape matches the exterior shape of the disk or surface 169. Additionally, the recess 145A may have a depth that permits the exterior surface of the disk or surface 169 to mount flush with the exterior surface of the bottom of the gearbox 145.

In one aspect, depressing the adjustable setting mechanism 166 compresses the spring 164 and moves the rod 165 and the disk 169 downward and away from the bottom of the gearbox 145, in the direction indicated by the arrow 169B. Upon rotation of the adjustable setting mechanism 166, the gear 157 will move along the toothed cross bars 141 such that the cross bars 141 may be quickly adjusted, laterally. This, in turn, will provide adjustment to the gripping arms (e.g., inwards or outwards). Once the adjustment is made, releasing the adjustable setting mechanism 166 decompresses the spring 164 which, in turn, causes the rod 165 and the disk 169 to move upward toward the bottom of the gearbox 145 until a tooth or teeth 169A engage the recess(es) 145A This causes the gear 157 to lock with relation to the toothed cross bars 141, thus locking the gripping arms into a desired position.

Figure 9:
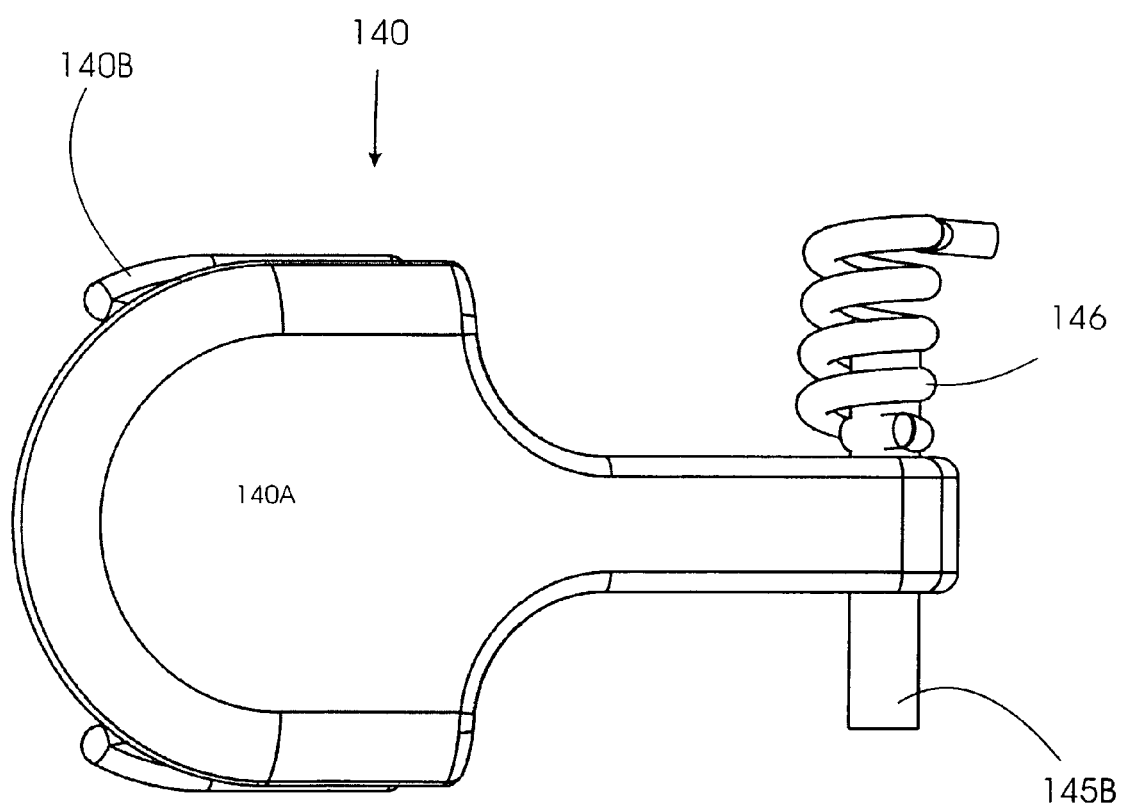
FIG. 9 is a top view of an adjustable clamp according to one embodiment of the invention.

FIG. 9 is a top view of an adjustable clamp 140 according to one embodiment of the invention. This figure illustrates the pivot 145B and its associated spring 146. Although not shown, a portion of the pivot 145B may include a dampening gear to slow the upward rotational motion of the adjustable clamp 140. If the adjustable clamp rotates upward too quickly, it may catapult an electrical device held between the upper arm 140A and the lower arm 140B. The pivot 145 may extend through a hollow center portion of the spring 146; and a free and of the spring 146 may couple to a portion of the gearbox 145.

Figure 10:
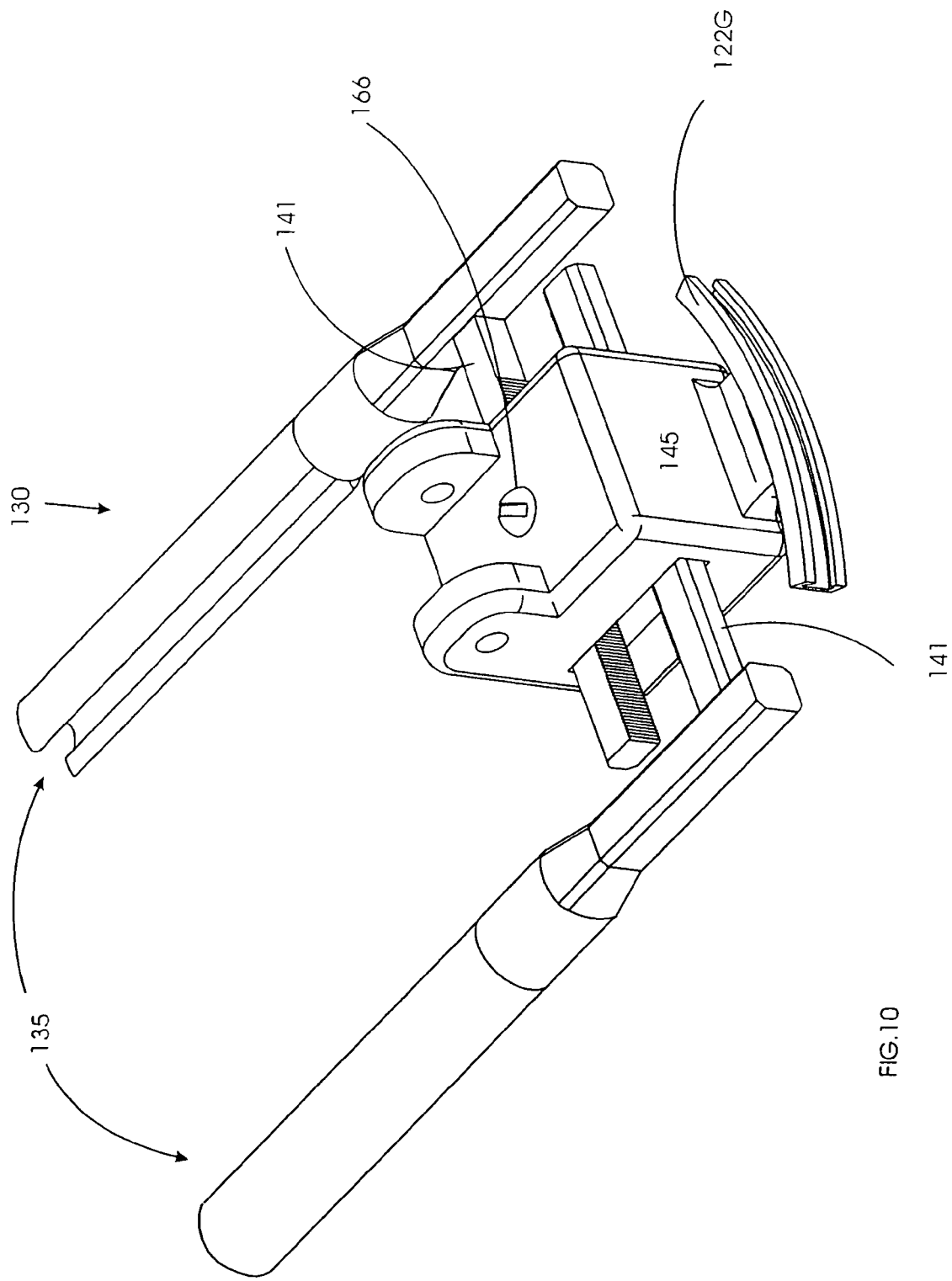
FIG. 10 is a perspective view of a pair of gripping arms according to one embodiment of the invention.

FIG. 10 is a perspective view of a pair of gripping arms 135 connected to a gearbox 145 by the toothed cross bars 141. This figure illustrates an embodiment of a curved rail guide 122G attached to an outer surface of the gearbox 145. In one embodiment, the curved rail guide 122G slidably couples to the curved rod 122D shown in FIG. 4. The figure also shows an illustrative placement of the setscrew 166 of FIG. 8.

Figure 11:
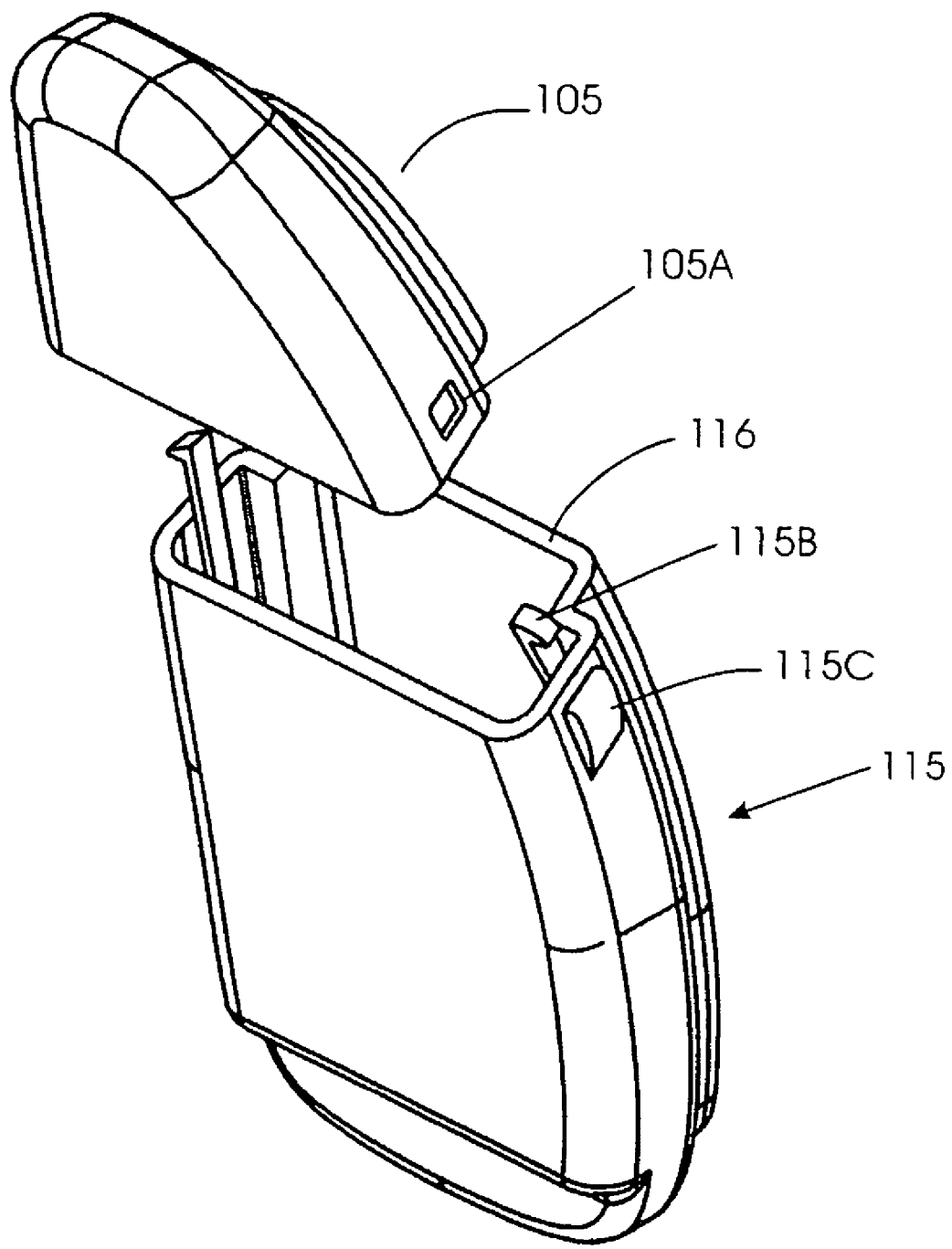
FIG. 11 is a perspective view of the housing shown in FIG. 1 according to one embodiment of the invention.

FIG. 11 is a perspective view of another embodiment of the housing 115 and end cap 105. In this embodiment, at least one recess 105A is formed in a portion of the end cap 105, and at least one corresponding latch 115B is formed to protrude above the rim 116 of the housing 115. In this manner, the latch 115B engages the recess 105A when the end cap 105 is flush with the rim 116 of the housing 115. An actuator 115C, accessible from the outside of the housing 115B, may be used to release the catch 115B from the recess 105A so that the end cap 105 may be removed, and the set of extendible links (not shown in FIG. 11) extended from within the interior of the housing 115.

Although a mechanical latch 115B is illustrated, the invention is not so limited, but may include other types of mechanical, magnetic, electromagnetic, and electromechanical latches as schematically represented in FIG. 11. For example, in an alternative embodiment, the housing 115 may include a power source, such as, but not limited to, a battery, and a force producer such as, but not limited to, a motor and rack, a motor and flat gears, a linear motor, or magnetic extractors/retractors. In such an embodiment, the actuator 115C may be linked to the power source and force producer such that manipulation of the actuator 115C releases the end cap 105 and mechanically expels a set of links (not shown). A subsequent manipulation of the same or different actuator may mechanically retract the set of links and latch the end cap 105 securely to the housing 115.

Figure 12:
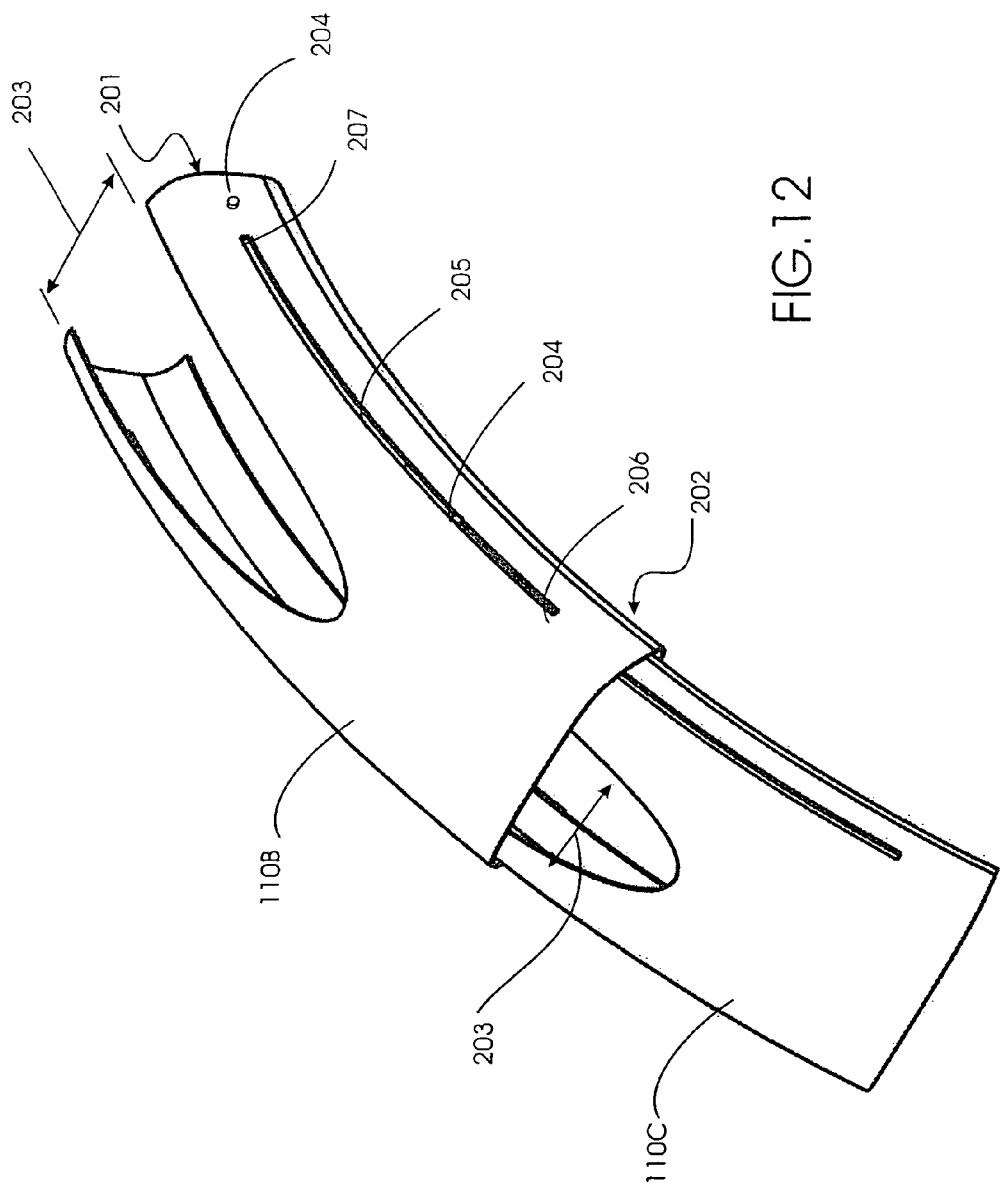
FIG. 12 is a perspective view of a set of extendable links according to one embodiment of the invention.

FIG. 12 is a perspective view of two extendable links 110B and 110C of the set of links 110 that are illustratively shown in FIG. 1A. Each link 110B and 110C is roughly rectangular shaped and slightly curved. The curve is a preferable feature, not only because it helps the headset fit a wearer's head, but also because it adds strength to each link. As shown, each link includes a base end 201 that is slightly wider than an opposite distal end 202. An oblong groove 203 extends along a length of each link 110B and 110C. As a result, the base end 201 has two forks separated by a gap. This arrangement permits the forks to naturally flex outwards slightly. Additionally, a peg 204 is formed on a side surface of each link 110B and 110C near the base end 201 of each fork.

When the link 110C is nested within the link 110B, the peg 204 formed on the side of the base end of the link 110C slidably fits within a slot 205 formed in the side of the link 110B. When the links 110B and 110C are fully extended, the peg 204 stops when it contacts the end 206 of the slot 205, and when the links 110B and 110C are fully retracted, the peg 204 stops at the end 207 of the slot 205. This arrangement prevents the links 110B and 110C from separating during extension or retraction. Such a set of links may be extended and retracted by hand or extended via springs and retracted by hand. However, the invention is not limited to only this type of extendable/retractable link system, but may include other link systems, such as those shown in the following figures.

Figure 13A:
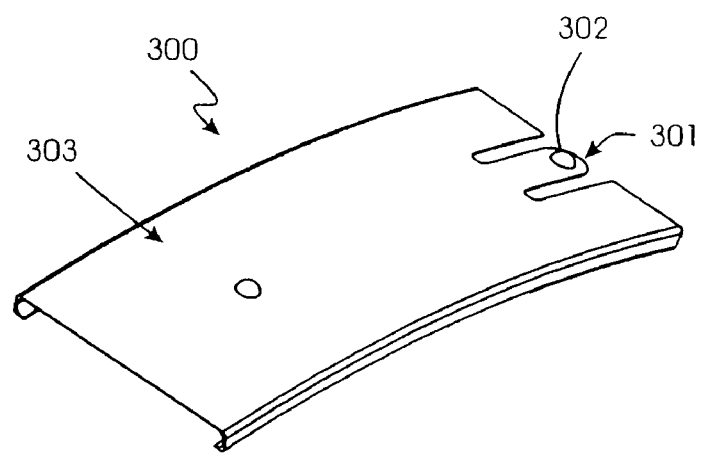
FIG. 13A is a perspective view of an extendable link according to one embodiment of the invention.
Figure 13B:
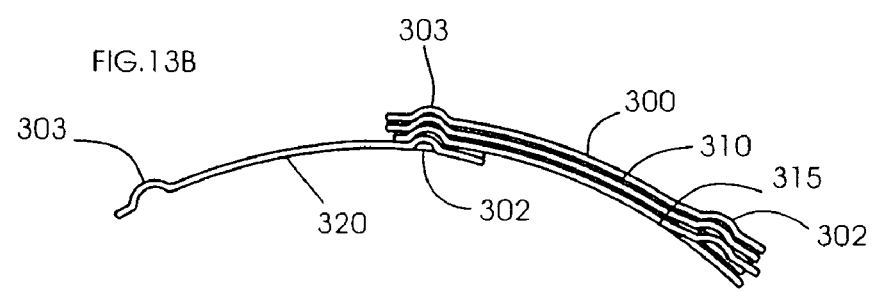
FIG. 13B is a side view of a set of extendable links according to one embodiment of the invention.
Figure 13C:
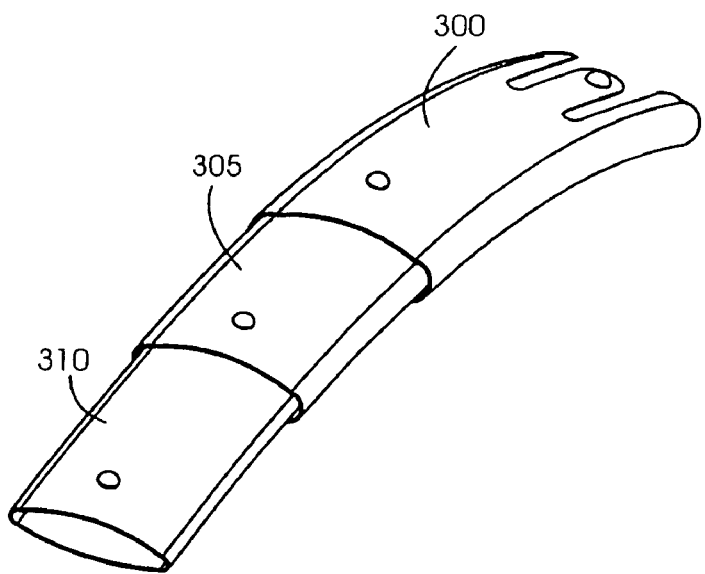
FIG. 13C is a perspective view of a set of extendable links, according to one embodiment of the invention.

FIG. 13A is a perspective view of an extendable link, generally denoted as reference numeral 300, according to one embodiment of the invention. FIG. 13B is a side view of a set of extendable links 300, in addition to 305, 310, 315, and 320. FIG. 13C is a perspective view of the set of extendable links 300, 305, and 310 of FIG. 13B.

As shown in FIG. 13A, the link 300 is rectangular in shape. One end includes two notches such that a top portion of the link 300 forms a flexible member 301. A detent 302 and 303 are formed at opposing ends of the link. The detent 301 is formed on a portion of the link between the two notches. The link 300 further includes an underside rail 308, extending slightly inwardly.

As shown in FIG. 13B, the links 300, 310, 315, and 320 may be stacked one above the other, such that a concave underside of the detents 302 and 303 of link 300 rests on the convex upper surface of the detents 302 and 303, respectively, of link 305, and so forth. As shown, the links may be extended one at a time, from the bottom up because the lowest flexible member 301 can always flex. Also, the remaining links may be telescoped together.

Referring to FIG. 13C, when the links 310, 305, and 300 are extended, the detent 302 of bottom link 310 will engage the detent 303 of the adjacent link 305; and the detent 302 of the link 305 will engage the detent 303 of the next adjacent link 300, and so forth. An advantage of the embodiment shown in FIGS. 13A-13C is that the links may compress entirely one over the other, which is an efficient use of length. Also, an inner link will glide along the rail of the outer link. The link 310, or innermost link, may not include a rail, in one embodiment. In this scenario, the link 310 may be a solid piece, for example.

Figure 14A:
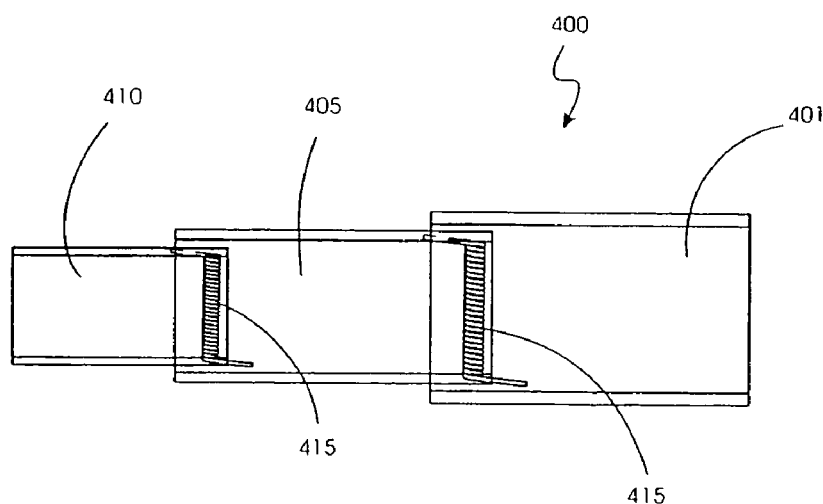
FIG. 14A is another set of extendable links according to another embodiment of the invention.

FIG. 14A is another set of extendable links 400, according to another embodiment of the invention. In this embodiment, each of links 401, 405, and 410 are links of sequentially decreasing diameter. For example, the diameter of link 401 is greater than the diameter of link 405, and the diameter of link 405 is greater than the diameter of the link 410, and so on. In this embodiment, the base ends of the links 405 and 410 are fitted with torsion springs or torsion bars 415.

Figure 14B:
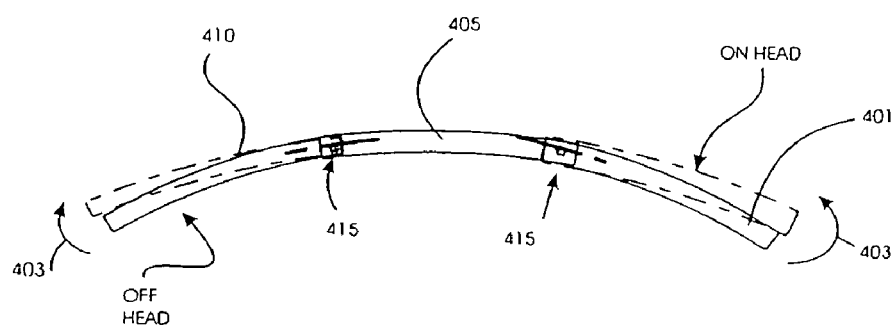
FIG. 14B is a side view of the set of extendable links shown in FIG. 14A.

FIG. 14B is a side view of the set of extendable links shown in FIG. 14A. As shown, the forces exerted by the torsion springs (or bars) 415 cause the links 401, 405, and 410 to rotate downward when extended. When the links are placed on a wearer's head, the links 401 and 410 resist the spring force such that they move slightly upwards in the direction indicated by the arrows 403.

Figure 14C:
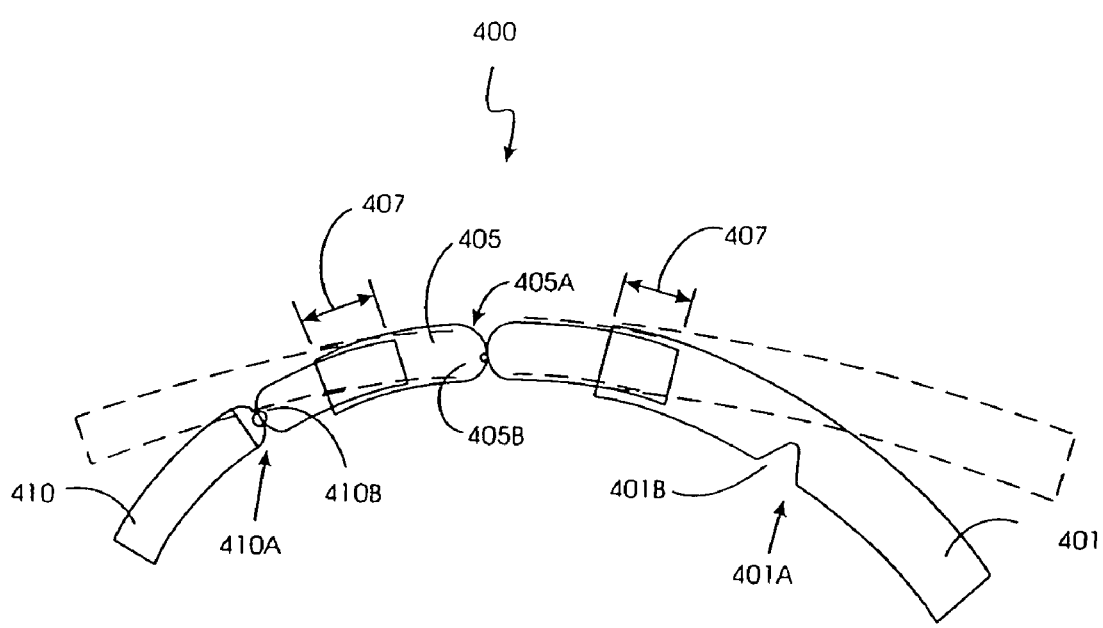
FIG. 14C is another side view of the set of extendable links shown in FIG. 14A.

FIG. 14C is another side view of the set of extendable links 400 shown in FIG. 14A. As shown, the overlap joints 407 will remain rigid. These joints may also include detents that keep the links 401, 405, and 410 in the extended position. The links may be retracted by hand. As shown, the flexing of the links 401, 405, and 410 (which may be made of plastic, metal, or other suitable material), will occur at the center portions 401A, 405A, and 410A, respectively, of each link, thus allowing the links 401, 405, and 410 to provide a spring force around a wearer's head. As shown, the center portion of each link may be formed of a single piece of pre-stressed material (portion 401A) or of two separate pieces hinged together (e.g., portions 405A and 410A).

In the embodiment using portion 401A), a notch 401B is formed in each side of a U-shaped link 401. In this embodiment, the spring force is provided by pre-stressing the material forming the link 401 during a molding process. In the embodiment using portions 405A and 410A, the spring force is provided by a spring 410B, substantially centrally disposed within an interior portion of the links 405 and 410.

Figure 15:
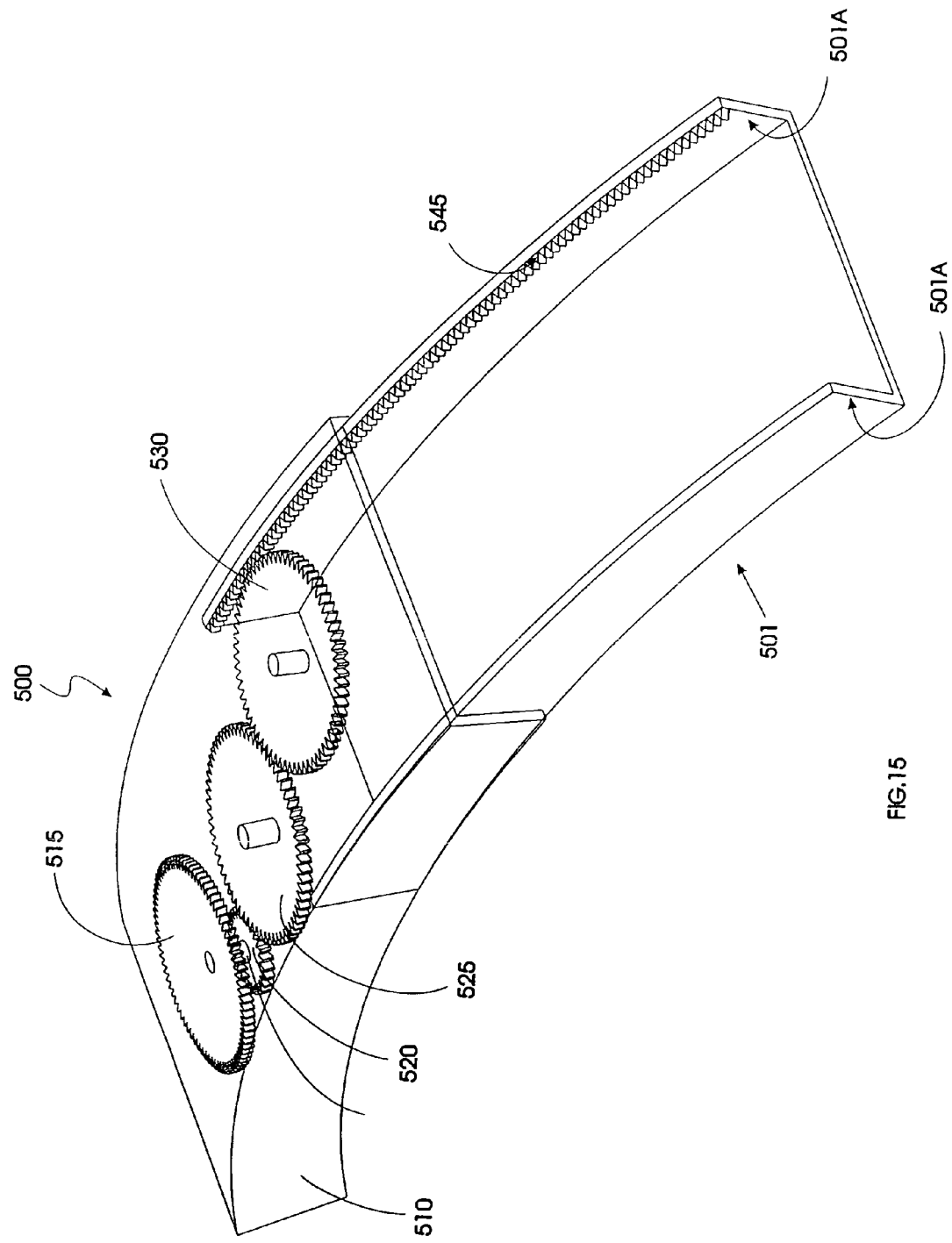
FIG. 15 is a perspective, sectional view of a motorized set of extendable links according to one embodiment of the invention.

FIG. 15 is a perspective, sectional view of a set of extendable links 500, according to one embodiment of the invention. Each of links 501 and 510 is U-shaped, (or may include a hollow interior surface). The wider link 510 is inverted over the link 501 such that the walls of the link 510 overlap the walls 501A of the link 501. The link 510 includes one or more gears 515, 520, 525, and 530. One gear 515 is mounted above the exterior top surface of the link 510 to connect to a force provider, such as a rotary motor or a linear motor, or a manual turning knob. The gear 515 is connected by a shaft 540 to a smaller diameter gear 520. The gear 520 meshes with a larger diameter offset gear 525, which meshes with another offset gear 530 of about the same diameter. Both the gear 525 and the gear 520 walk in toothed tracks 545 formed on the inside upper rim of the walls 510A. Turning of the driving gear 515 rotates the smaller gear 520, which rotates walker gear 525 to simultaneously engage with the toothed track and the other walker gear 530. Movement of the walker gears 525 and 530 along the toothed track 545 causes the link 510 to move along the length of the link 501. In one embodiment, a portion of the housing 115 may be coupled to the link 510 such that movement of the portion of the housing from a first to a second position extends or retracts the remainder of the nested links.

Figure 16:
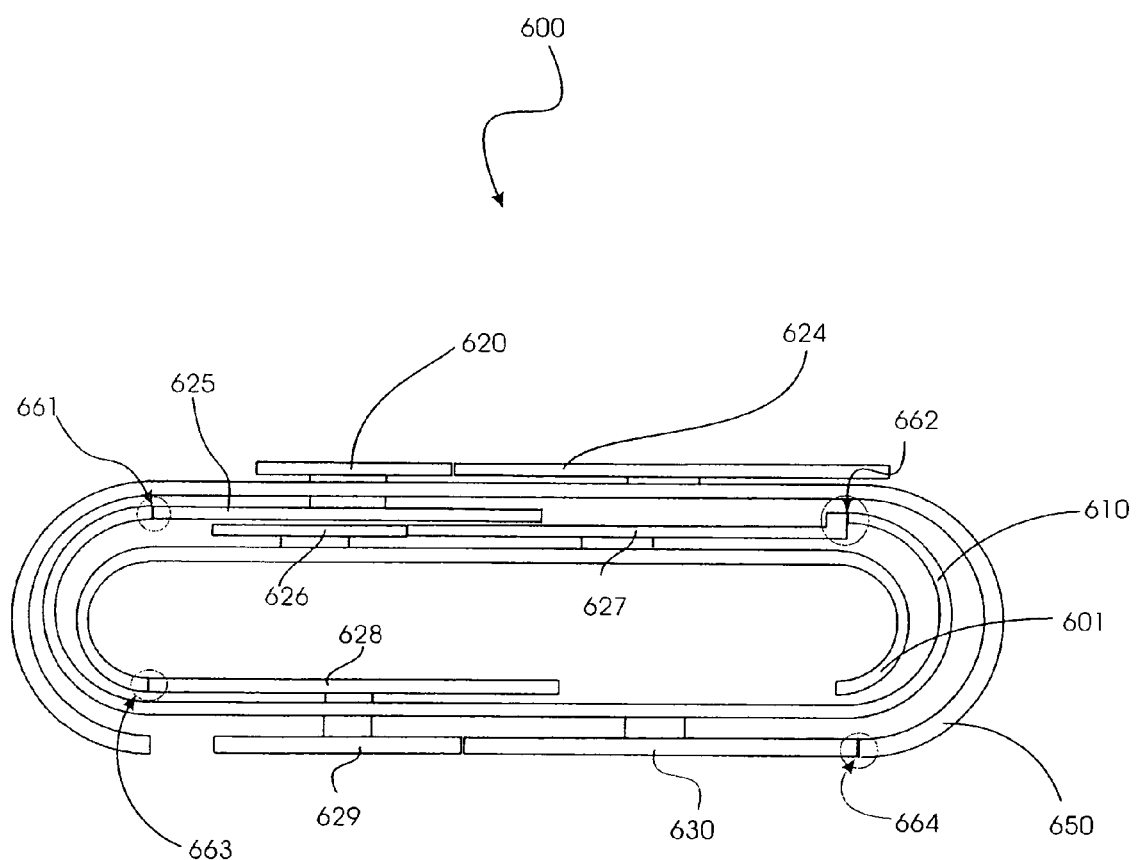
FIG. 16 is an end view of another motorized set of extendable links according to one embodiment of the invention.

FIG. 16 is an end view of another embodiment of a set of extendable links. In this embodiment, each link 601 and 610 includes gears, e.g., preferably at least four gears. Illustratively, the link 601 is shown nested inside the link 610, which is shown nested inside the link 650. On the exterior surface of the link 650, a driving gear 624 and a reduction gear 620 are formed. The reduction gear is connected by a shaft to a walker gear 625. Rotation of the driving gear 624 and the reduction gear 620 causes the walker gear 625 to move along the track 661. This causes the link 610 to extend or retract. The movement of the link 610, in turn, engages the gears 626, 627, 628, 629, and 630 to move along the tracks 662, 663, and 664 such that the links 610 and 601 are also extended or retracted.

Figure 17A:
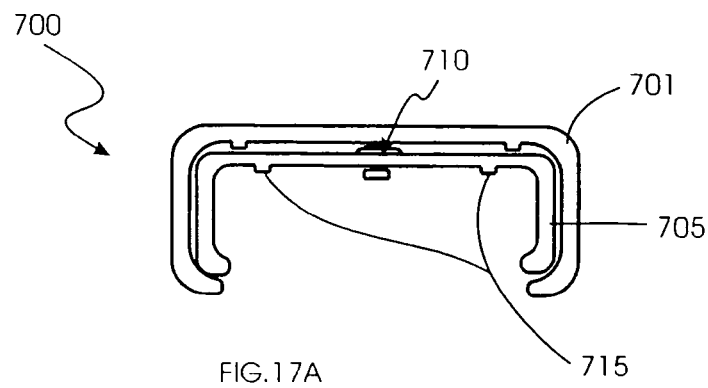
FIG. 17A is an end view of a set of extendable links according to one embodiment of the invention.
Figure 17B:
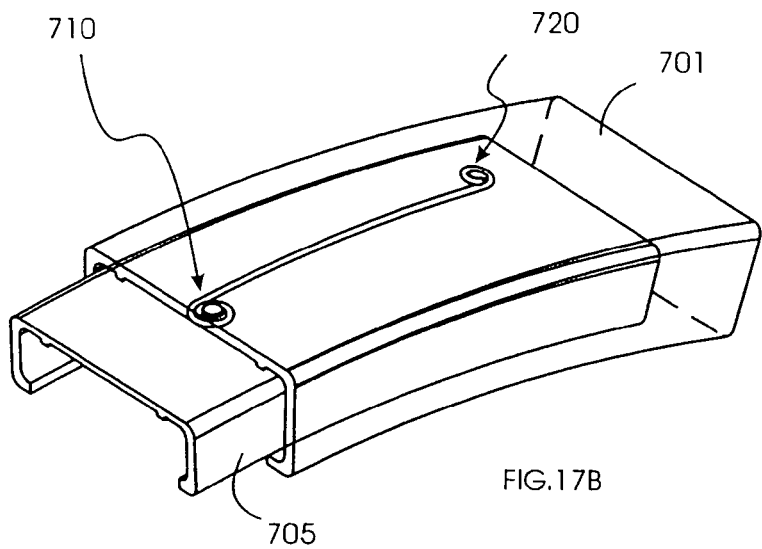
FIG. 17B is a perspective, sectional view of the set of extendable links of FIG. 17A.
Figure 17C:
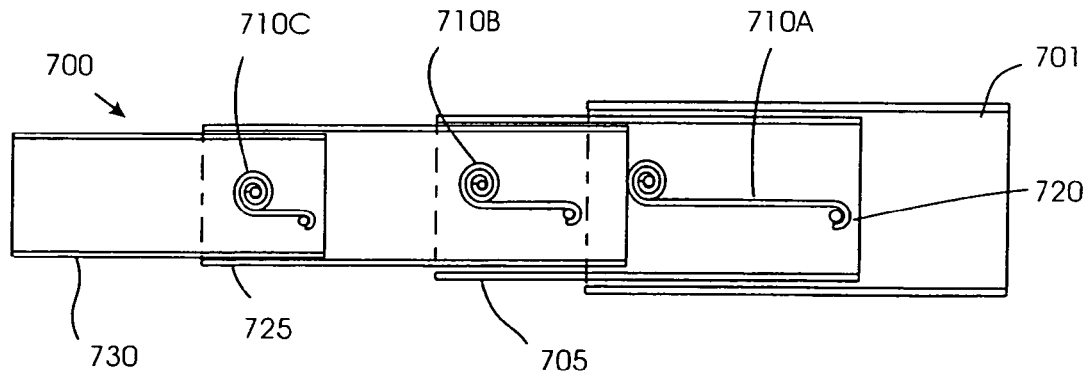
FIG. 17C is a top, sectional view of the set of extendable links of FIG. 17A.

FIG. 17A is an end view of a set of extendable links 700, according to one embodiment of the invention. FIG. 17B is a perspective, sectional view of the set of extendable links of FIG. 17A. FIG. 17C is a top, sectional view of the set of extendable links of FIG. 17A.

Referring to FIG. 17A, the set of links 700 includes an outer link 701 having at least one inner nested link 705. Additionally, one or more ribs 715 may be formed on the inner upper surfaces of the outer link 701 and the inner link 705. The ribs 715 space the links apart and provide strength. As shown in FIGS. 17A and 17B, a helical spring 710 may be mounted to an inner surface of the outer link 701, with one end of the helical spring 710 attached to a peg 720 formed on an upper surface of one end of the inner link 705.

As shown in FIG. 17C, each spring 710A, 710B, and 710C exerts a force that attempts to extend the two connected links. For example, spring 710A attempts to extend outer link 701 and inner link 705. When the end cap 105 is released, the forces exerted by the springs 710A, 710B, and 710C will automatically extend the set of links 700.

FIG. 18A is a perspective view of another extendable link 801, according to another embodiment of the invention. As shown in FIG. 18A, the link 801 is rectangular shaped and has a C-shaped cross-section. A hollow guide 802 is attached to the inside upper surface of the link 801.

FIG. 18B is an end view of a set of extendable links 801 and 805, identical to the link shown in FIG. 18A. FIG. 18C is a top, cross-sectional view of the set of extendable links 801 and 805 of FIG. 18B. As shown in FIGS. 18B and 18C a plurality of links may be nested together. Illustratively, an outer link 801 with attached hollow guide 802 embraces the inner link 805. The inner link 805 also has an attached hollow guide 802A, which may have a larger diameter than the hollow guide 802 to envelop the hollow guide 802 as shown in FIG. 18C. A wire (push noodle) 803 may extend through the hollow guides 802 and 802A. FIG. 18D illustrates this more clearly.

FIG. 18D is another top, cross-sectional view of the set of extendable links 801 and 805 of FIG. 18B, according to one embodiment of the invention. In FIG. 18D, a spool 806 is mounted within the interior of a housing 115. A helical spring 807 is attached to the spool, which in turn, is coupled to one end of the wire 803. The other end of the wire pushes against an end cap 808 of the last link 810. The helical spring 807 provides a force to unwrap and push the wire 803 such that when the end cap 105 is released, the wire 803 automatically extends the set of links 800 from the inner-most link outwards. The set of links 800 may be retracted within the housing by hand. The telescoping hollow guides in the links 801, 805, and 810 ensure that the wire will not from buckle.

Figure 19:
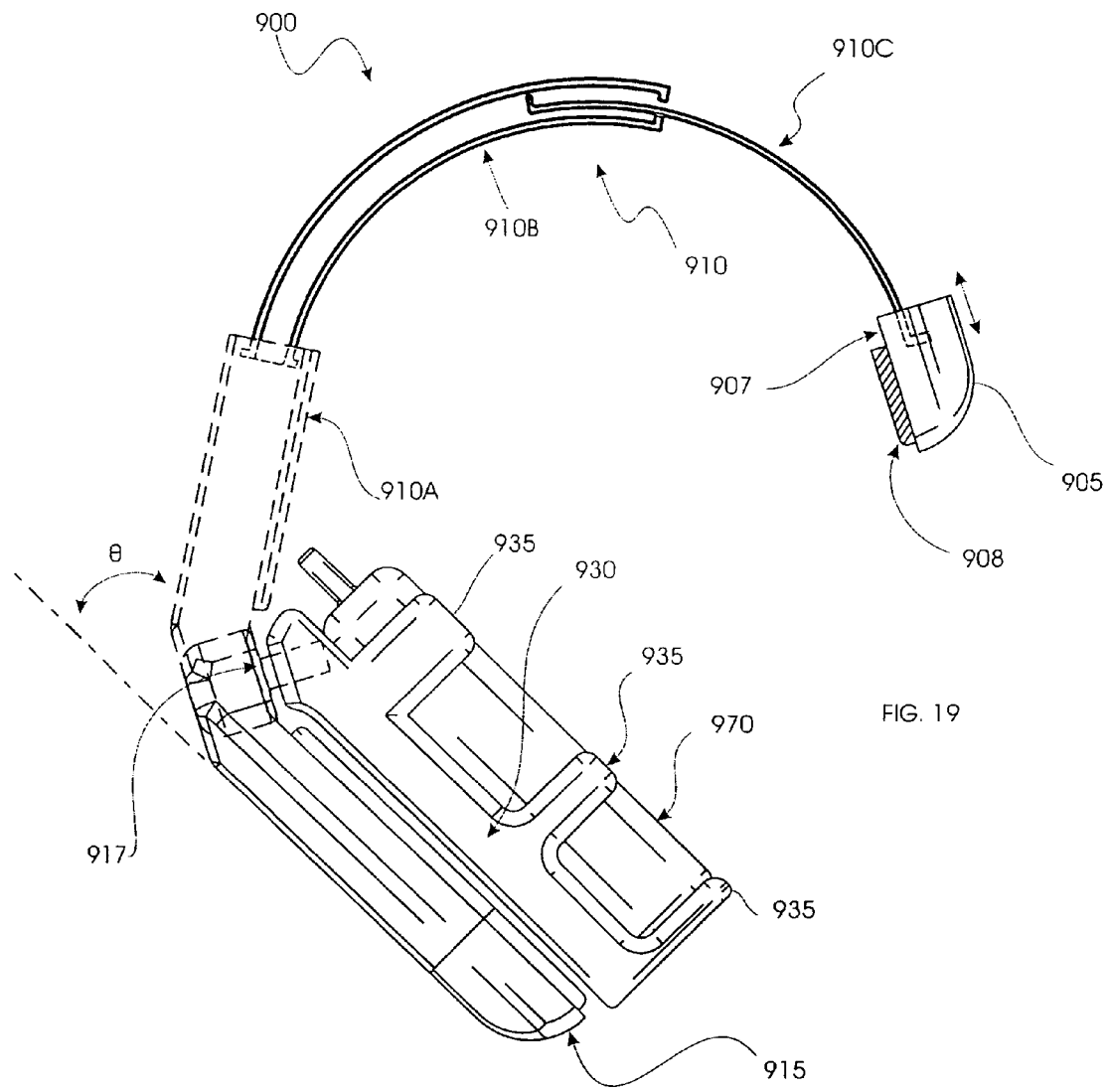
FIG. 19 is a side view of a headset having a pre-formed gripping device, according to one embodiment of the invention.

FIG. 19 is a side view of a headset 900 having a pre-formed gripping device 930, according to one embodiment of the invention. As shown, the headset includes a headband 910 connected between the end cap 905 and the housing 915. The headband 910 includes a set of nestable, retractable links 910A, 910B, and 910C. When the headband 910 is retracted, the base link 910A may slidably fit within an angled channel 917, which is formed within the interior of the housing 915. Thus, when the headband 910 is in the fully retracted position, the base 907 of the end cap 905 contacts a surface of the angled channel 917. In an alternative embodiment, the base link 910A may rotate 180° degrees about the exterior of the housing 915 so that the end cap 905 is lockably positioned proximate the bottom end of the housing 915. The angled channel 917 may form a compound angle θ with either the vertical or horizontal so that the headband may be extended over a user's head with one hand, while the housing 915, gripping device 930, and electronic device 970 are held against the user's ear with the other hand.

In an alternative embodiment, the housing 915 may be rotatably coupled the gripping device 930. In such an embodiment, the link 910B movably couples to the housing 915. The housing 915 may rotate from a closed position to an operating position. In the retracted, closed position, the base 907 of the end cap 905 may contact a portion of the housing 915 to fully enclose the set of nestable, extendable links 910.

Alternatively, the housing 915 may be attached to the gripping device 930 and may further include a rotatable member (not shown), which is movably coupled to a link of the set of nestable, extendable links 910. The rotatable member may rotate from a closed position to an operating position. In the retracted, closed position, the base 907 of the end cap 905 may contact a portion of the rotatable member to fully enclose the set of nestable, extendable links 910.

The links 910A, 910B, and 910C may be formed of plastic, metal, or a combination thereof, and may be configured in manners similar to the embodiments previously described. Additionally, the headband 910 and/or the end cap 905 may be weighted to counterbalance the weight of the housing, gripping device, and/or an electronic device 970 gripped by the gripping device 930. A latch may be included in the housing 915 to lock the end cap 905 in the retracted position. An actuator may also be included in the housing 915 to extend and/or retract the nestable, extendable set of links 910.

In the embodiment of FIG. 19, the gripping device 930 may be a single piece of injection molded plastic formed to the predetermined exterior measurements of a particular electronic device. In this embodiment, the gripping device includes opposing arms 935, preferably three sets of such opposing arms. In this manner, the electronic device can be removably snap-fitted within the gripping arms 935.

Operation of Use

In operation, when the end cap 105 is removed from the housing 115, the headband formed of a set of extendable links 110 extends from the housing 115. If this is the first time the gripping device has been used for a particular electronic device 170 (shown in FIG. 1A), the wearer depresses then adjusts a setscrew in the top of the gearbox 145 and extends the gripping arms 135 slightly wider than the width of the electronic device. The electronic device 170 is then held between the gripping arms as they are adjusted inwards to touch the sides of the electronic device 170. At this point, the set screw is released to secure the gripping arms 105 into position.

The electronic device 170 is then removed from between the gripping arms 135 and one end of the electronic device 170 is inserted within the adjustable clamp 140, between the upper arm 140A and the lower arm 140B. At this point, the electronic device is positioned upwards and outwards from the plane of the gripping arms 135. Downward pressure is applied to the adjustable clamp 140 to rotate the electronic device 170 downward until it engages the gripping arms 135. Additional downward pressure is applied to the adjustable clamp 140 to rotate the gripping arms 135 up and away from each other so that the slotted gripping portion 135C conforms about the side of the electronic device 170, and the adjustable clamp 140 locks into position. Thereafter, the headset 100 is positioned on a wearer's head, and the electronic device 170 is hand-adjusted to an optimal operating position, which differs for each wearer.

The electronic device 170 may be removed from the gripping device 130 while the headset is worn, or when the headset is taken off, by applying a downward pressure to the adjustable clamp 140 to unlock it and to further rotate the gripping arms 135 downward so that they free the electronic device 170 to rise. A dampening gear coupled to the adjustable clamp 140 ensures that the electronic device 170 rises in a controlled fashion and does not catapult out of the gripping device 130. Thereafter, pressure is applied to the end cap 105 to retract the headband into the interior of the housing 115. The gripping device may then be rotated upwards 90 degrees, and swiveled 180 degrees inwards towards the interior of the housing 115, until the headset 100 is in a closed position (illustratively shown in FIGS. 2A and 2B).

The foregoing description of one or more embodiments has been presented for purposes of illustration and description, and is not intended to be exhaustive or to limit the invention to the precise form or methods disclosed. Rather, it is intended that the scope of the invention not be limited by the specification, but be defined by the claims set forth below.

What is claimed is:

1. A gripping device for a portable electronic or communication device, comprising:
a plurality of adjustable gripping arms, each of the plurality of gripping arms attached to a cross bar having a toothed portion that engages with a portion of a gear that is rotatably coupled to a pivot; and
an adjustable clamp rotatably coupled to another pivot and coupled to a dampening gear, the adjustable clamp positioned between at least two of the plurality of adjustable gripping arms.

2. The gripping device of claim 1, wherein the adjustable clamp further comprises an upper arm and a lower arm separated by a gap, and the adjustable clamp rotates within a plane that is substantially orthogonal to a plane passing through each of the pair of adjustable gripping arms.

3. The gripping device of claim 2, wherein each gripping arm of the pair of gripping arms further comprises:
a rotatable slotted gripping material having a base end coupled to a spring housing;
a spring located within the spring housing; and
a base end coupled to the spring housing.

4. The gripping device of claim 3, further comprising a swivel arm and a connector attached to a portion of the swivel arm.

5. The gripping device of claim 1, further comprising an adjustable locking mechanism coupled to the gear and rotatable such that, upon rotation, the gear moves across the toothed portion of the cross bar to move the plurality of gripping arms.

6. The gripping device of claim 5, wherein the adjustable locking mechanism is spring loaded and is housed within a gearbox with the gear and portions of the cross bar.

7. The gripping device of claim 5, wherein the adjustable locking mechanism includes a bottom surface having projections which are mate with a corresponding depressions within a recessed portion of a gearbox.

8. A wearable holder for a portable electronic or communication device, comprising:
a gripping device having a plurality of gripping arms forming a receptacle dimensioned to correspond to one or more outer dimensions of a device;
a housing coupled to the gripping device and having an angled channel formed within a top portion of the housing at a compound angle; and
a nestable, extendable set of links coupled to the housing and movable between an open position and a retracted position.

9. The wearable holder of claim 8, wherein the housing is rotatably coupled to the gripping device and movable from a closed position to an operating position.

10. The wearable holder of claim 9, wherein:
one link of the nestable, extendable set of links is coupled to an end cap; and
the housing and the end cap enclose the nestable, extendable set of links when the nestable, extendable links are retracted.

11. The wearable holder of claim 8, wherein at least one of an end cap and a link of the set of links is weighted to counterbalance a weight of the gripping device.

12. The wearable holder of claim 8, wherein the housing further includes a latch to secure an end cap to the housing.

13. The wearable holder of claim 8, wherein the housing includes a rotatable member coupled to a link of the set of nestable, extendable links.

* * * * *